United States Patent [19]

Makino et al.

[11] Patent Number: 4,622,280

[45] Date of Patent: Nov. 11, 1986

[54] DISAZO COMPOUND, AND PHOTOCONDUCTIVE COMPOSITION AND ELECTROPHOTOGRAPHIC PHOTORECEPTOR CONTAINING THE SAME

[75] Inventors: Naonori Makino; Kouichi Kawamura; Seiji Horie; Hideo Sato, all of Saitama, Japan

[73] Assignee: Fuji Photo Film Co., Ltd., Kanagawa, Japan

[21] Appl. No.: 755,504

[22] Filed: Jul. 16, 1985

Related U.S. Application Data

[63] Continuation of Ser. No. 714,235, Mar. 21, 1985, which is a continuation of Ser. No. 459,061, Jan. 18, 1983, abandoned.

[30] Foreign Application Priority Data

Jan. 18, 1982 [JP] Japan .................................. 57-6605
May 4, 1982 [JP] Japan .................................. 57-73437
Jun. 15, 1982 [JP] Japan .................................. 57-101341

[51] Int. Cl.⁴ .............................................. G03G 5/06
[52] U.S. Cl. ........................................ 430/70; 430/75; 430/76
[58] Field of Search ...................... 430/77, 78, 79, 72, 430/70, 75, 76

[56] References Cited

U.S. PATENT DOCUMENTS 4,349,616  9/1982  Sasaki et al. ........................ 430/79
4,359,515  11/1982  Katagiri et al. ....................... 430/79

*Primary Examiner*—John L. Goodrow
*Attorney, Agent, or Firm*—Sughrue, Mion, Zinn Macpeak & Seas

[57] ABSTRACT

Disazo compounds represented by the following general formula (I) are disclosed. The compounds can function as effective photoconductive substances and further, as efficient charge carrier (both electron and positive hole) generating compounds in an electrophotographic photoreceptor:

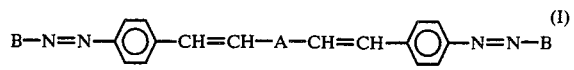

wherein A represents and B represents (Abstract continued on next page.)

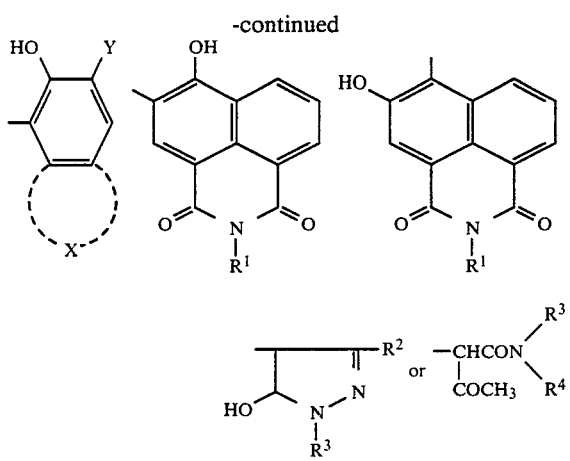

(wherein X represents atoms necessary to form an aromatic ring, such as a naphthalene ring, an anthracene ring, etc., or a netero ring, such as an indole ring, a carbazole ring, a dibenzofuran ring etc., (all of which rings may be either substituted ones or nonsubstituted ones) by combining with the benzene ring to which a hydroxyl group and a group Y are attached; Y represents

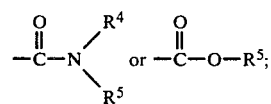

$R^1$ represents an alkyl group, a phenyl group or a substituted group thereof; $R^2$ represents a hydrogen atom, a lower alkyl group, a carbamoyl group, a carboxyl group, an alkoxycarbonyl group, an aryloxycarbonyl group, or a substituted or a nonsubstituted amino group; $R^3$ and $R^5$ each represents an alkyl group, an aromatic ring residue like a phenyl group, an aromatic heterocyclic residue like a dibenzofranyl group, a carbazolyl group, etc., or a substituted group thereof; and $R^4$ represents a hydrogen atom, an alkyl group, a phenyl group or a substituted group thereof).

10 Claims, 4 Drawing Figures

DISAZO COMPOUND, AND PHOTOCONDUCTIVE COMPOSITION AND ELECTROPHOTOGRAPHIC PHOTORECEPTOR CONTAINING THE SAME

This is a continuation of application Ser. No. 714,235, filed Mar. 21, 1985, which was a continuation of application Ser. No. 459,061, filed Jan. 18, 1983, now abandoned.

FIELD OF THE INVENTION

This invention relates to a novel disazo compound, a photoconductive composition containing this disazo compound, and an electrophotographic phororeceptor which has an electrophotographic photoreceptive layer containing this disazo compound.

BACKGROUND OF THE INVENTION

The photoconduction process of an electrophotographic photoreceptor is comprised of (1) the step of generating charges by exposure to light, and (2) the step of transporting charges.

Steps (1) and (2) may be effected using the same substance such as a selenium photosensitive plate. However, steps (1) and (2) may be carried out using different substances, for example, the combination of amorphous selenium and poly-N-vinylcarbazole is well-known. Carrying out steps (1) and (2) separately using different substances has advantages that materials to be employed in a photoreceptor can be selected from a wide variety of materials. Accordingly, electrophotographic characteristics, such as photosensitivity, acceptable potential and so on, are improved, and it becomes also possible to select materials which are well-suited for producing photoreceptors using a coating technique and such materials can be selected from a wide range of substances.

Substances which have so far been employed as photoconductive materials of photoreceptors to be used in electrophotographic systems include such inorganic substances as selenium, cadmium sulfide, zinc oxide and so on.

Electrophotography, as Carlson has already disclosed in U.S. Pat. No. 2,297,691, utilizes photoconductive materials which can change their electric resistance with exposure amounts they receive during imagewise exposure, have an electrically insulating property in the dark, and can be provided on supports using coating techniques. In general a photoconductive material receives dark adaptation processing for a proper period of time and is then forced to create uniform charge on its surface in the dark. The material is then subjected to imagewise exposure through such an irradiation pattern that it has the effect of reducing the surface charge depending upon relative energies contained in its constituent parts, respectively. The remaining surface charge or electrostatic latent image on the surface of the photoconductive layer (photo-receptive layer) is subsequently converted to a visible image by allowing it to come into contact with a proper charge-detecting and -developing substance, that is, toner.

Toner, whether it is contained in an insulating liquid or in a dry carrier, can adhere to the surface of the photo-receptive layer corresponding to a charge pattern. The toner which sticks to the charge pattern can be fixed thereon by known means, for example, by application of heat, pressure or solvent vapor. Alternatively, an electrostatic latent image can be transferred onto the second support (e.g., paper, films or so on). Similarly, an electrostatic latent image transferred on the second support can be developed thereon. The electrophotographic method is one of the known image-forming processes which is designed to form an image in the above-described manner.

Fundamental characteristics required of photoreceptors in electrophotography as described above are (1) a proper height of surface potential which can be created thereon by charging in the dark, (2) a high charge retentivity in the dark which can be aquired by reduced dark decay of surface charge, (3) rapid decay of surface charge by light-exposure, and so on. In fact, the above-described, conventionally used inorganic substances have many advantages and at the same time, suffer from various defects. For instance, selenium, which is prevailingly used as a photoreceptor at present, fully satisfies the above-described requisites (1) to (3). However, it suffers from the defects that conditions for manufacturing selenium photoreceptors are difficult to create and maintain. Therefore, the cost of manufacturing them becomes high, selenium photoreceptors must be handled with care due to their high sensitivities to heat and mechanical impact, and difficulties arise in shaping them into a belt-form due to lack of flexibility. Cadmium sulfide and zinc oxide are each used as a photoreceptor in the form of a dispersion in a resin which functions as a binder. Such a photoreceptor is disadvantageous mechanically, that is, its surface smoothness, harness, tensile strength, frictional resistance and the like are too low to use them repeatedly.

Recently, electrophotographic photoreceptors utilizing organic substances have been proposed with the intention of removing defects inherent in the above-described inorganic substances, and some of them have already been submitted to practical use. Specific examples include a photoreceptor constituted with poly-N-vinylcarbazole and 2,4,7-trinitrofluorene-9-one (as described in U.S. Pat. No. 3,484,237), poly-N-vinylcarbazole sensitized with dyes of pyrylium salt type (as described in published examined Japanese Patent Application No. 25658/73 corresponding to U.S. Pat. No. 3,617,268), photoreceptors containing organic pigments as their principal components (as described in published examined Japanese Patent Application No. 1194/81 published unexamined Japanese Patent Application No. 133445/78, European Pat. No. 34,498 and U.S. Pat. No. 3,898,084), photoreceptors containing eutectic complexes consisting of dyes and resins as their principal components (as described in published unexamined Japanese Patent Application No. 10785/72 corresponding to U.S. Pat. Nos. 3,732,180 and 3,684,502) and so on.

Those organic electrophotographic photoreceptors are improved in mechanical characteristics and flexibility to some extent compared with those of the above-described inorganic ones. However, taking into account the present state of organic photoreceptors, for example, the organic ones are generally inferior to the inorganic ones in terms of photosensitivity. Further, they are unsuitable for repeated use. Accordingly, those which fully satisfy all of requirements for a photoreceptor to be employed in electrophotography have not yet been obtained.

SUMMARY OF THE INVENTION

As a result of various investigations to discover novel photoreceptors free from defects of conventional electrophotographic photoreceptors, it has now been found that electrophotographic photoreceptors containing a novel disazo compound described below possess both high photosensitivities and high durabilities to an extent which is sufficient for practical use.

The present invention comprises a novel disazo compound (disazo pigment) represented by the following general formula (I), a photoconductive composition containing such a disazo compound, and an electrophotographic photoreceptor having an electrophotographic photoreceptive layer which contains such a disazo compound.

More specifically, this invention comprises (1) a disazo compound represented by the following general formula (I):

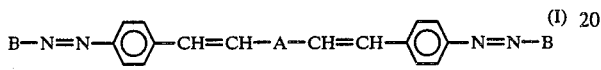
(I)

wherein A represents

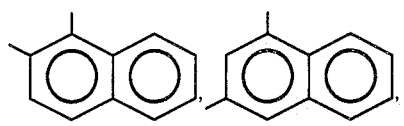

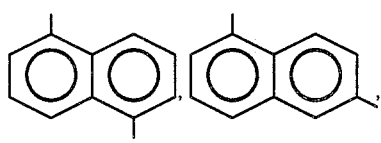

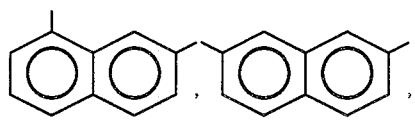

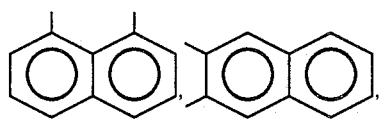

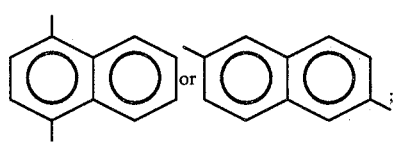

and B represents

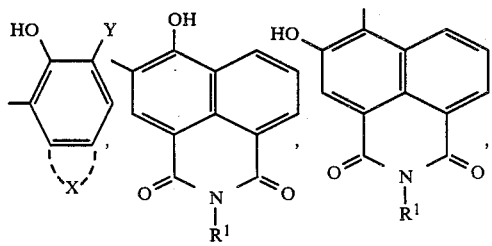

-continued

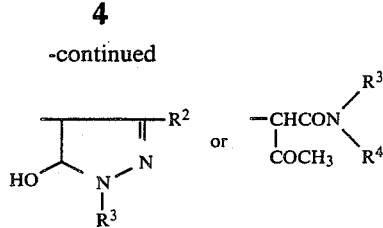

(wherein X represents atoms necessary to form an aromatic ring, such as a naphthalene ring, an anthracene ring, etc., or a hetero ring, such as an indole ring, a carbazole ring, a dibenzofuran ring, etc., (all of which rings may be either substituted or nonsubstituted ones) by combining with the benzene ring to which a hydroxyl group and a group Y are attached; Y represents

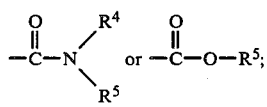

$R^1$ represents an alkyl group, a phenyl group or a substituted group thereof; $R^2$ represents a hydrogen atom, a lower alkyl group, a carbamoyl group, a carboxyl group, an alkoxycarbonyl group, an aryloxycarbonyl group, or a substituted or a nonsubstituted amino group; $R^3$ and $R^5$ each represents an alkyl group, an aromatic ring residue like a phenyl group, a naphthyl group, an anthranyl group, etc., an aromatic heterocyclic residue like a dibenzofranyl group, a carbazolyl group, a benzocarbazolyl group, an indolyl group, etc. or a substituted group thereof; and $R^4$ represents a hydrogen atom, an alkyl group, a phenyl group or a substituted group thereof): (2) a photoconductive composition which contains a disazo compound represented by the above-described general formula (I): and (3) an electrophotographic photoreceptor having an electrophotographic photoreceptive layer which contains a disazo compound represented by the above-described general formula (I).

DETAILED DESCRIPTION OF THE INVENTION

Figure 1:
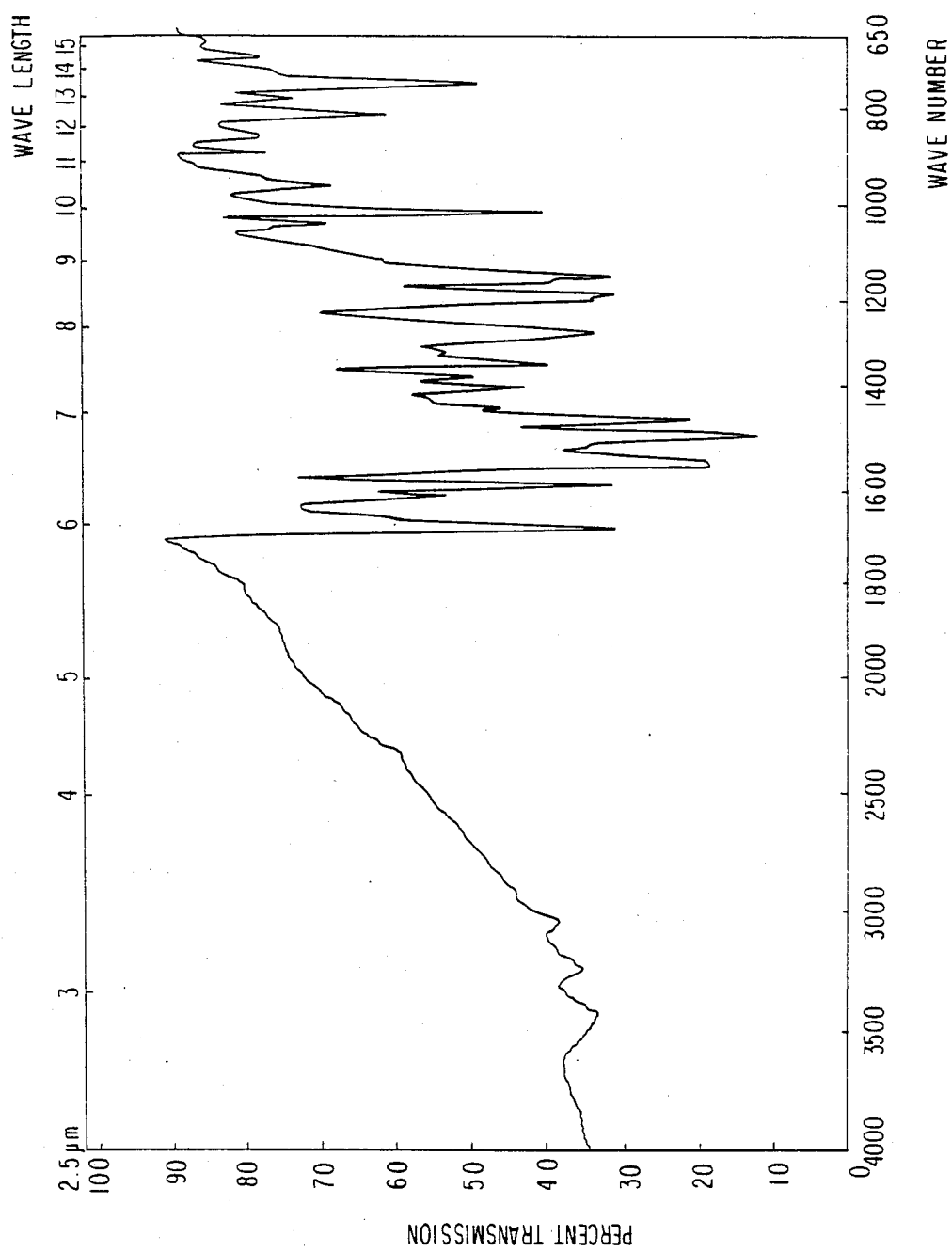
FIG. 1, FIG. 2, FIG. 3 and FIG. 4 are infrared absorption spectra (KBr method) of disazo compounds (2C), (11G), (2I) and (15J), respectively.

The disazo compound represented by the general formula (I) is described in more detail below. X is a moiety capable of forming an aromatic ring, such as a naphthalene ring, an anthracene ring, etc., or a heterocyclic ring, such as an indole ring, a carbazole ring, a benzocarbazole ring, a dibenzofuran ring, etc., by condensing with the benzene ring to which a hydroxyl group and Y are attached.

When X is an aromatic ring moiety or a heterocyclic ring moiety having a certain substituent, suitable examples of such a substituent include halogen atoms (e.g., a fluorine atom, a chlorine atom, a bromine atom, etc.) and lower alkyl groups, preferably those having 1 to 8 carbon atoms (e.g., a methyl group, an ethyl group, a propyl group, a butyl group, an isopropyl group, an isobutyl group, etc.). Such a ring moiety may also have one or two substituents selected from the above-described ones. When the ring moiety has two substituents the two substituents may be either the same as or different from each other.

$R^1$ represents an alkyl group, preferably that which has 1 to 12 carbon atoms, or a phenyl group.

Concrete examples of a nonsubstituted alkyl group represented by $R^1$ include methyl group, ethyl group, propyl group, butyl group, pentyl group, hexyl group, isopropyl group, isobutyl group, isoamyl group, isohexyl group, neopentyl group, tert-butyl group and so on.

Suitable examples of substituents which the alkyl group represented by $R^1$ may have include a hydroxyl group, alkoxy groups having 1 to 12 carbons atoms, a cyano group, an amino group, alkylamino groups having 1 to 12 carbon atoms, dialkylamino groups whose alkyl moieties have 1 to 12 carbon atoms, halogen atoms, aryl groups having 6 to 15 carbon atoms and so on. Specific examples of substituted alkyl groups which $R^1$ may represent, include hydroxyalkyl groups (e.g., hydroxymethyl group, 2-hydroxyethyl group, 3-hydroxypropyl group, 2-hydroxy propyl group, etc.), alkoxyalkyl groups (e.g., methoxymethyl group, 2-methoxyethyl group, 3-methoxypropyl group, ethoxymethyl group, 2-ethoxyethyl group, etc.), cyanoalkyl groups (e.g., cyanomethyl group, 2-cyanoethyl group, etc.), aminoalkyl groups (e.g., aminomethyl group, 2-aminoethyl group, 3-aminopropyl group, etc.), (alkylamino)alkyl groups (e.g., (methylamino)methyl group, 2-(methylamino)ethyl group, (ethylamino)methyl group, etc.), (dialkylamino)alkyl groups (e.g., (dimethylamino)methyl group, 2-(dimethylamino)ethyl group, etc.), halogenoalkyl groups (e.g., fluoromethyl group, chloromethyl group, bromomethyl group, etc.), and aralkyl groups (e.g., benzyl group, phenetyl group, etc.).

Suitable examples of substituents which the phenyl group represented by $R^1$ may have include a hydroxyl group, alkoxy groups having 1 to 12 carbon atoms, cyano group, amino group, alkylamino groups having 1 to 12 carbon atoms, dialkylamino groups having two alkyl groups containing 1 to 12 carbon atoms, halogen atoms, alkyl groups having 1 to 6 carbon atoms, nitro group and so on. Specific examples of substituted phenyl groups which $R^1$ may represent include a hydroxyphenyl group, alkoxyphenyl groups (e.g., methoxyphenyl group, ethoxyphenyl group, etc.), cyanophenyl group, aminophenyl group, (alkylamino)phenyl groups (e.g., (methylamino)phenyl group, (ethylamino)phenyl group, etc.), (dialkylamino)phenyl groups (e.g., (dimethylamino)phenyl group, etc.), halogenophenyl groups (e.g., fluorophenyl group, chlorophenyl group, bromophenyl group, etc.), alkylphenyl groups (e.g., tollyl group, ethylphenyl group, cumenyl group, xylyl group, mesityl group, etc.), nitrophenyl group and phenyl groups having two or three substituents selected from the above-described ones (wherein the substituents may be either the same or different, and they may be situated in any positions and further, may bear any positional relations among them).

Suitable examples of groups represented by $R^2$ include a hydrogen atom, lower alkyl groups having 1 to 6 carbon atoms, a carbamoyl group, a carboxyl group, alkoxycarbonyl groups whose alkoxy moieties contain 1 to 12 carbon atoms, aryloxycarbonyl groups whose aryloxy moieties contain 6 to 20 carbon atoms, and nonsubstituted and substituted amino groups.

Specific examples of a substituted amino group represented by $R^2$ include a methylamino group, ethylamino group, propylamino group, phenylamin group, tolylamino group, benzylamino group, phenetylamino group, dimethylamino group, diethylamino group and a diphenylamino group.

Specific examples of a lower alkyl group represented by $R^2$ include a methyl group, ethyl group, propyl group, butyl group, isopropyl group and a isobutyl group.

Specific examples of an alkoxycarbonyl group represented by $R^2$ include a methoxycarbonyl group, ethoxycarbonyl group, propoxycarbonyl group, butoxycarbonyl group, isopropoxycarbonyl group and a benzyloxycarbonyl group.

Specific examples of an aryloxycarbonyl group represented by $R^2$ include phenoxycarbonyl, toluoxycarbonyl and so on.

Suitable examples of groups represented by $R^3$ and $R^5$ respectively include alkyl groups containing 1 to 20 carbon atoms, aryl groups such as phenyl group, naphthyl group, etc., aromatic heterocyclic groups containing oxygen, nitrogen, sulfur and like atoms respectively, such as dibenzofranyl group, carbazolyl group, benzocarbazolyl group, etc., and substituted groups thereof.

Specific of a nonsubstituted and a substituted alkyl group represented by $R^3$ or $R^5$ include the same groups as described in their respective examples of $R^1$.

Suitable examples of substituents which $R^3$ and $R^5$ may have when they are substituted aryl groups such as substituted phenyl groups, substituted naphthyl groups, etc., or hetero atom-containing substituted aromatic heterocyclic groups such as substituted dibenzofranyl groups, substituted carbazolyl groups, etc. include hydroxyl group, cyano group, nitro group, halogen atoms (e.g., fluorine atom, chlorine atom, bromine atom, etc.), alkyl groups containing 1 to 12 carbon atoms (e.g., methyl group, ethyl group, propyl group, isopropyl group, etc.), alkoxy groups containing 1 to 12 carbon atoms (e.g., methoxy group, ethoxy group, propoxy group, butoxy group, pentyloxy group, isopropoxy group, isobutoxy group, isoamyloxy group, tert-butoxy group, neopentyloxy group, etc.), amino group, alkylamino groups containing 1 to 12 carbon atoms (e.g., methylamino group, ethylamino group, propylamino group, etc.), dialkylamino groups containing 1 to 12 carbon atoms (e.g., dimethylamino group, diethylamino group, N-methyl-N-ethylamino group, etc.), arylamino groups containing 6 to 12 carbon atoms (e.g., phenylamino group, tolylamino group, etc.), diarylamino groups whose aryl moieties contain 6 to 15 carbon atoms (e.g., diphenylamino group, etc.), carboxyl group, alkali metal carboxylato groups (alkali metals (cations) for example, $Na^+$, $K^+$, $Li^+$ and the like), alkali metal sulfonato groups (alkali metals (cations) for example, $Na^+$, $K^+$, $Li^+$ and the like), alkylcarbonyl groups (e.g., acetyl group, propionyl group, benzylcarbonyl group, etc.), arylcarbonyl groups whose aryl moieties contain 6 to 12 carbon atoms (e.g., benzoyl group, toluoyl group, furoyl group, etc.), alkylthio groups containing 1 to 12 carbon atoms (e.g., methylthio group, ethylthio group, etc.) and arylthio groups containing 1 to 12 carbon atoms. The substituted aromatic groups which $R^3$ or $R^5$ represents may have 1 to 3 substituents selected from the above-described substituents. When plural substituents are attached to the aromatic group, they may be the same or different, may be employed in arbitrary combination, and may be situated at any positions.

$R^4$ represents a hydrogen atom, an alkyl group containing 1 to 20 carbon atoms, phenyl group, or a substituted group thereof.

Concrete examples of a nonsubstituted or a substituted alkyl group and a substituted phenyl group, respectively, represented by $R^4$ include the same groups as described in their individual concrete examples of $R^3$ or $R^5$.

A preferable example of A is a naphthalene group of 1,4-, 2,6- or 1,5-naphtahlene ring.

A preferable example of B, which is derived from a coupler, is a group (1), (2) or (3), and more preferable example of B is a group (1) providing a highly photosensitive photoconductive composition or electrophotographic photoreceptive layer, and producing a disazo compound at a low price, because starting materials for the synthesis of such a coupler are readily available.

Therein, suitable examples of X are a benzene ring, a carbazole ring and a dibenzofuran ring, and those of Y are

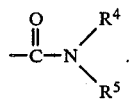

Specific examples of the disazo compound of this invention are tabularly illustrated below.

In the following structural formulae, for example, the moiety

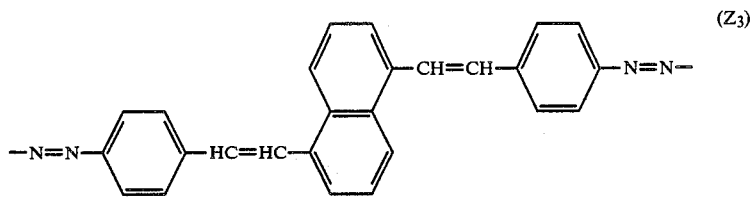

of the structual formula is contained as a common structual unit in the compounds (1A) to (74A) to be illustrated below and therefore, it is abbreviated as $Z_1$, and groups other than $Z_1$ in the formula (1A) which are present at the left hand and at the right hand of the formula are abbreviated as Group 1 and Group 2, respectively.

In the same manner, other compounds are tabularly illustrated and can be employed advantageously as the compound of this invention: They are the compounds (1B) to (74B) which contain as the common structural unit the following moiety $Z_2$ instead of the above-illustrated moiety $Z_1$ which is contained in the above-illustrated compounds (1A) to (74A), respectively;

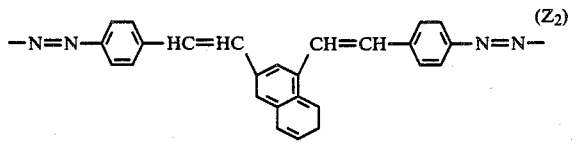

the compounds (1C) to (74C) which contain as the common structural unit the following moeity $Z_3$ instead of the moeity $Z_1$ in the compounds (1A) to (74A), respectively;

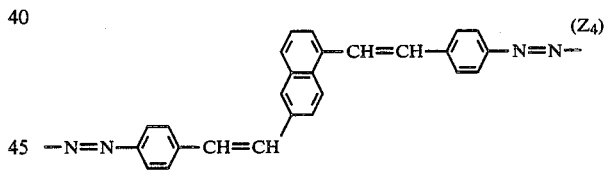

the compounds (1D) to (74D) which contain as the common structural unit the following moiety $Z_4$ instead of the moiety $Z_1$ in the compounds (1A) to (74A) respectively;

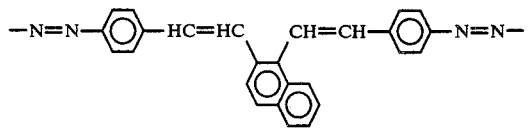

the compounds (1E) to (74A) which contain as the common structural unit the following moiety $Z_5$ instead of the moiety $Z_1$ in the compounds (1A) to (74A) respectively;

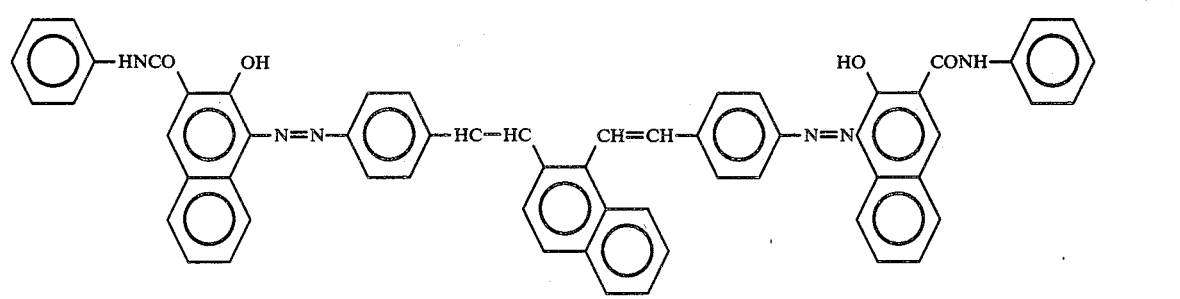

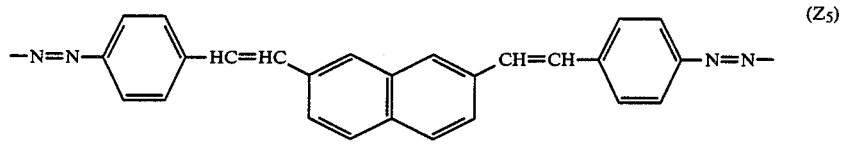

the compounds (1F) to (74F) which contain as the common structural unit the following moiety $Z_6$ instead of the moiety $Z_1$ in the compounds (1A) to (74A) respectively;

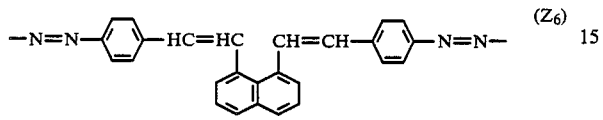

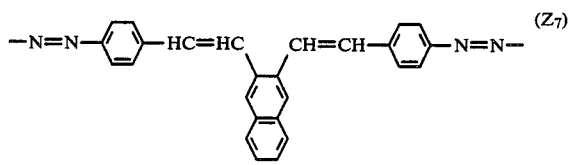

the compounds (1G) to (74G) which contain as the common structural unit the following moiety $Z_7$ instead of the moiety $Z_1$ in the compounds (1A) to (74A) respectively;

the compounds (1H) to (74H) which contain as the common structural unit the following moiety $Z_8$ instead of the moiety $Z_1$ in the compounds (1A) to (74A) respectively;

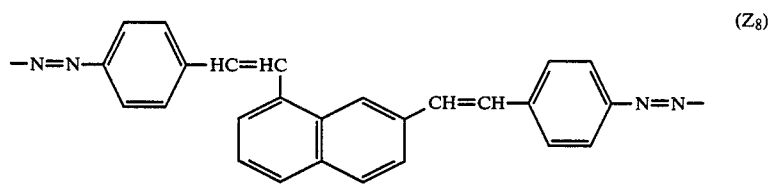

the compounds (1I) to (74I) which contain as the common structural unit the following moiety $Z_9$ instead of the moiety $Z_1$ in the compounds (1A) to (74A) respectively;

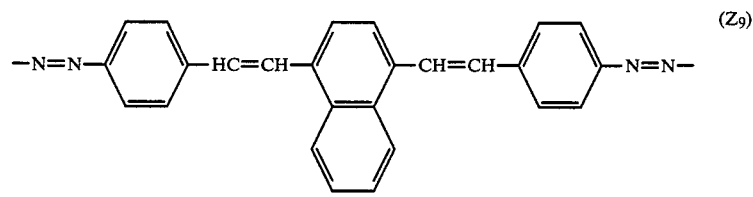

and the compounds (1J) to (74J) which contain as the common structural unit the following moiety $Z_{10}$ instead of the moiety $Z_1$ in the compounds (1A) to (74A) respectively;

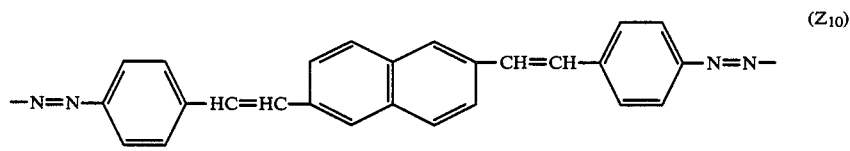

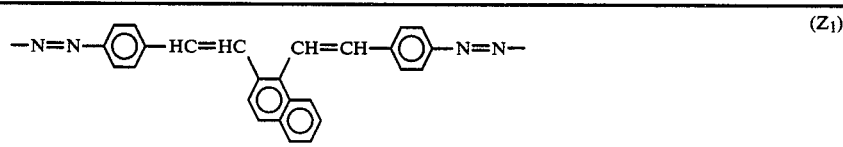

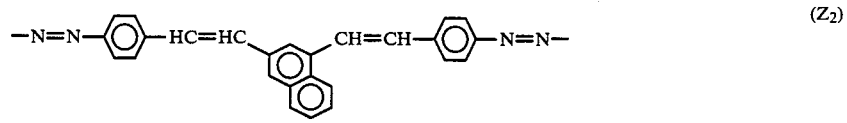

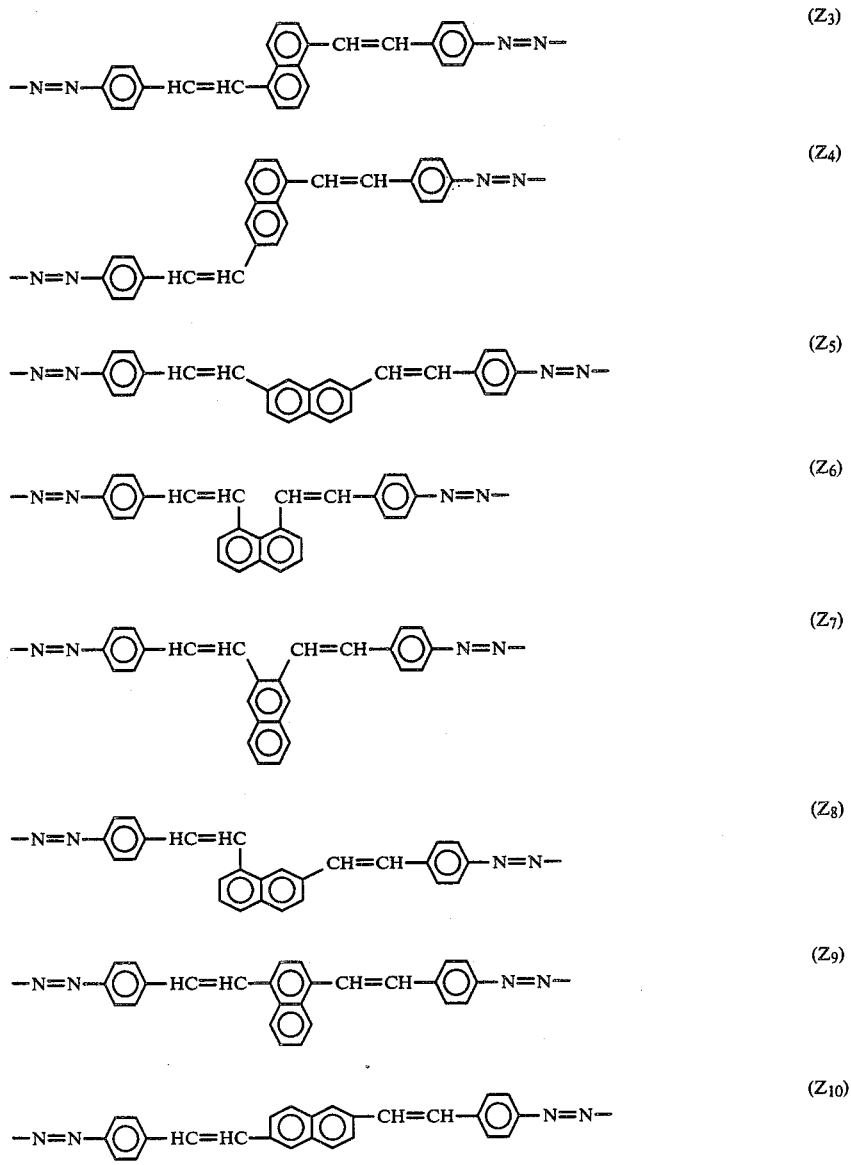

-continued

| | | | |
|---|---|---|---|
| 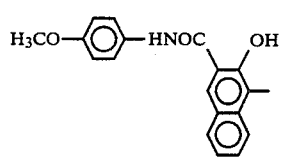 | $Z_1$ $Z_2$ $Z_3$ $Z_4$ $Z_5$ $Z_6$ $Z_7$ $Z_8$ $Z_9$ $Z_{10}$ | HO—C₆H₃(CH₃)—CONH—C₆H₄—OCH₃ | 3A 3B 3C 3D 3E 3F 3G 3H 3I 3J |
| 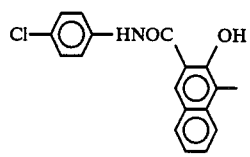 | $Z_1$ $Z_2$ $Z_3$ $Z_4$ $Z_5$ $Z_6$ $Z_7$ $Z_8$ $Z_9$ $Z_{10}$ | HO—C₆H₃(CH₃)—CONH—C₆H₄—Cl | 4A 4B 4C 4D 4E 4F 4G 4H 4I 4J |
| 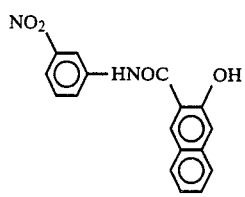 | $Z_1$ $Z_2$ $Z_3$ $Z_4$ $Z_5$ $Z_6$ $Z_7$ $Z_8$ $Z_9$ $Z_{10}$ | HO—C₆H₃(CH₃)—CONH—C₆H₄—NO₂ (m) | 5A 5B 5C 5D 5E 5F 5G 5H 5I 5J |
| 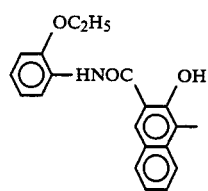 | $Z_1$ $Z_2$ $Z_3$ $Z_4$ $Z_5$ $Z_6$ $Z_7$ $Z_8$ $Z_9$ $Z_{10}$ | HO—C₆H₃(CH₃)—CONH—C₆H₄—OC₂H₅ | 6A 6B 6C 6D 6E 6F 6G 6H 6I 6J |
| 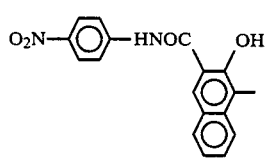 | $Z_1$ $Z_2$ $Z_3$ $Z_4$ $Z_5$ $Z_6$ $Z_7$ $Z_8$ $Z_9$ $Z_{10}$ | HO—C₆H₃(CH₃)—CONH—C₆H₄—NO₂ | 7A 7B 7C 7D 7E 7F 7G 7H 7I 7J |
| 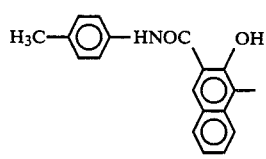 | $Z_1$ $Z_2$ $Z_3$ $Z_4$ $Z_5$ $Z_6$ $Z_7$ $Z_8$ $Z_9$ $Z_{10}$ | HO—C₆H₃(CH₃)—CONH—C₆H₄—CH₃ | 8A 8B 8C 8D 8E 8F 8G 8H 8I 8J |
| 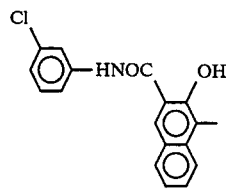 | $Z_1$ $Z_2$ $Z_3$ $Z_4$ $Z_5$ $Z_6$ $Z_7$ $Z_8$ $Z_9$ $Z_{10}$ | HO—C₆H₃(CH₃)—CONH—C₆H₄—Cl | 9A 9B 9C 9D 9E 9F 9G 9H 9I 9J |

-continued

| | | | |
|---|---|---|---|
| 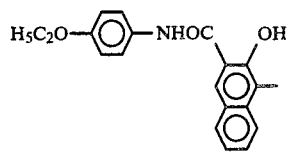 | $Z_1$ $Z_2$ $Z_3$ $Z_4$ $Z_5$ $Z_6$ $Z_7$ $Z_8$ $Z_9$ $Z_{10}$ | HO—⟨⟩—CONH—⟨⟩—OC$_2$H$_5$ | 10A 10B 10C 10D 10E 10F 10G 10H 10I 10J |
| 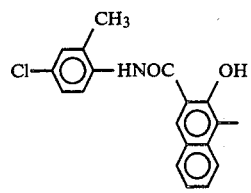 | $Z_1$ $Z_2$ $Z_3$ $Z_4$ $Z_5$ $Z_6$ $Z_7$ $Z_8$ $Z_9$ $Z_{10}$ | | 11A 11B 11C 11D 11E 11F 11G 11H 11I 11J |
| 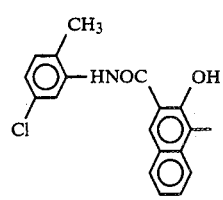 | $Z_1$ $Z_2$ $Z_3$ $Z_4$ $Z_5$ $Z_6$ $Z_7$ $Z_8$ $Z_9$ $Z_{10}$ | | 12A 12B 12C 12D 12E 12F 12G 12H 12I 12J |
| 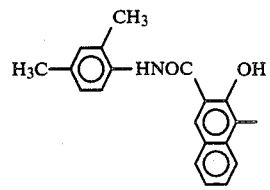 | $Z_1$ $Z_2$ $Z_3$ $Z_4$ $Z_5$ $Z_6$ $Z_7$ $Z_8$ $Z_9$ $Z_{10}$ | | 13A 13B 13C 13D 13E 13F 13G 13H 13I 13J |
| 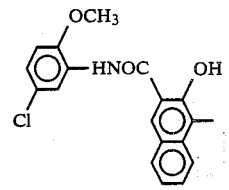 | $Z_1$ $Z_2$ $Z_3$ $Z_4$ $Z_5$ $Z_6$ $Z_7$ $Z_8$ $Z_9$ $Z_{10}$ | | 14A 14B 14C 14D 14E 14F 14G 14H 14I 14J |
| 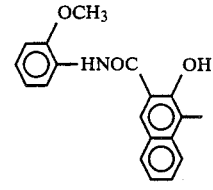 | $Z_1$ $Z_2$ $Z_3$ $Z_4$ $Z_5$ $Z_6$ $Z_7$ $Z_8$ $Z_9$ $Z_{10}$ | | 15A 15B 15C 15D 15E 15F 15G 15H 15I 15J |
| 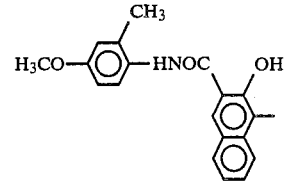 | $Z_1$ $Z_2$ $Z_3$ $Z_4$ $Z_5$ $Z_6$ $Z_7$ $Z_8$ $Z_9$ $Z_{10}$ | | 16A 16B 16C 16D 16E 16F 16G 16H 16I 16J |

-continued

| Structure (left) | Z | Structure (right) | Code |
|---|---|---|---|
| 2,5-dimethoxyphenyl-NHOC-(3-methyl-2-hydroxynaphthyl) | $Z_1$–$Z_{10}$ | (3-methyl-2-hydroxynaphthyl)-CONH-(2,5-dimethoxyphenyl) | 17A–17J |
| 4-chloro-2,5-dimethoxyphenyl-NHOC-(3-methyl-2-hydroxynaphthyl) | $Z_1$–$Z_{10}$ | (3-methyl-2-hydroxynaphthyl)-CONH-(4-chloro-2,5-dimethoxyphenyl) | 18A–18J |
| 5-chloro-2,4-dimethoxyphenyl-NHOC-(3-methyl-2-hydroxynaphthyl) | $Z_1$–$Z_{10}$ | (3-methyl-2-hydroxynaphthyl)-CONH-(5-chloro-2,4-dimethoxyphenyl) | 19A–19J |
| 4-(N,N-dimethylamino)phenyl-NHOC-(3-methyl-2-hydroxynaphthyl) | $Z_1$–$Z_{10}$ | (3-methyl-2-hydroxynaphthyl)-CONH-(4-(N,N-dimethylamino)phenyl) | 20A–20J |
| 4-cyanophenyl-NHOC-(3-methyl-2-hydroxynaphthyl) | $Z_1$–$Z_{10}$ | (3-methyl-2-hydroxynaphthyl)-CONH-(4-cyanophenyl) | 21A–21J |
| 4-carboxyphenyl-NHOC-(3-methyl-2-hydroxynaphthyl) | $Z_1$–$Z_{10}$ | (3-methyl-2-hydroxynaphthyl)-CONH-(4-carboxyphenyl) | 22A–22J |
| 4-(sodiumsulfo)phenyl-NHOC-(3-methyl-2-hydroxynaphthyl) | $Z_1$–$Z_{10}$ | (3-methyl-2-hydroxynaphthyl)-CONH-(4-SO$_3$Na-phenyl) | 23A–23J |

-continued
| | | |
|---|---|---|
| 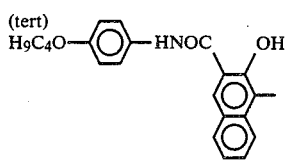 | $Z_1$ $Z_2$ $Z_3$ $Z_4$ $Z_5$ $Z_6$ $Z_7$ $Z_8$ $Z_9$ $Z_{10}$ | 24A 24B 24C 24D 24E 24F 24G 24H 24I 24J |
| 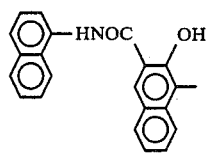 | $Z_1$ $Z_2$ $Z_3$ $Z_4$ $Z_5$ $Z_6$ $Z_7$ $Z_8$ $Z_9$ $Z_{10}$ | 25A 25B 25C 25D 25E 25F 25G 25H 25I 25J |
| 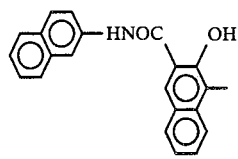 | $Z_1$ $Z_2$ $Z_3$ $Z_4$ $Z_5$ $Z_6$ $Z_7$ $Z_8$ $Z_9$ $Z_{10}$ | 26A 26B 26C 26D 26E 26F 26G 26H 26I 26J |
| 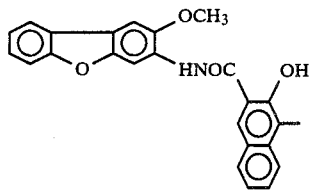 | $Z_1$ $Z_2$ $Z_3$ $Z_4$ $Z_5$ $Z_6$ $Z_7$ $Z_8$ $Z_9$ $Z_{10}$ | 27A 27B 27C 27D 27E 27F 27G 27H 27I 27J |
| 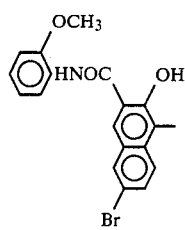 | $Z_1$ $Z_2$ $Z_3$ $Z_4$ $Z_5$ $Z_6$ $Z_7$ $Z_8$ $Z_9$ $Z_{10}$ | 28A 28B 28C 28D 28E 28F 28G 28H 28I 28J |
| 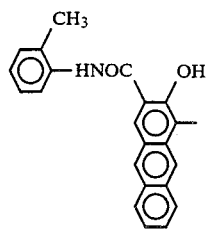 | $Z_1$ $Z_2$ $Z_3$ $Z_4$ $Z_5$ $Z_6$ $Z_7$ $Z_8$ $Z_9$ $Z_{10}$ | 29A 29B 29C 29D 29E 29F 29G 29H 29I 29J |
| 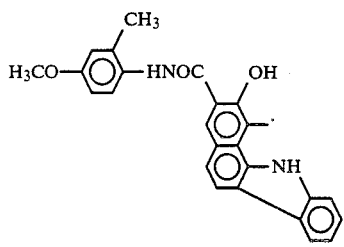 | $Z_1$ $Z_2$ $Z_3$ $Z_4$ $Z_5$ $Z_6$ $Z_7$ $Z_8$ $Z_9$ $Z_{10}$ | 30A 30B 30C 30D 30E 30F 30G 30H 30I 30J |

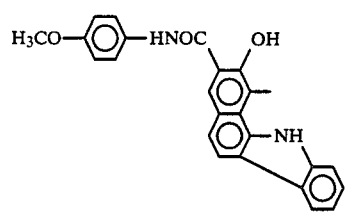
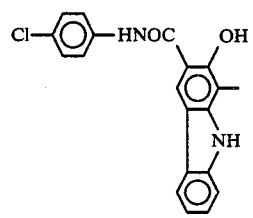
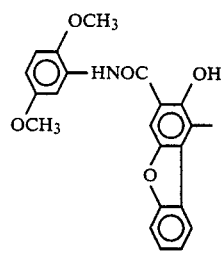
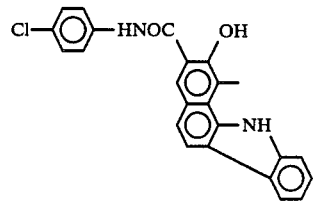
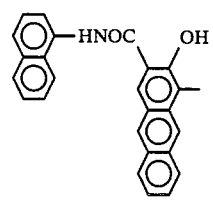
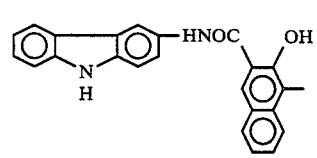
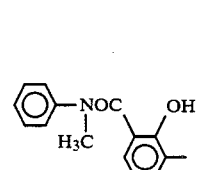
| | | |
|---|---|---|
| $Z_1$ | | 31A |
| $Z_2$ | | 31B |
| $Z_3$ | | 31C |
| $Z_4$ | | 31D |
| $Z_5$ | | 31E |
| $Z_6$ | | 31F |
| $Z_7$ | | 31G |
| $Z_8$ | | 31H |
| $Z_9$ | | 31I |
| $Z_{10}$ | | 31J |
| $Z_1$ | | 32A |
| $Z_2$ | | 32B |
| $Z_3$ | | 32C |
| $Z_4$ | | 32D |
| $Z_5$ | | 32E |
| $Z_6$ | | 32F |
| $Z_7$ | | 32G |
| $Z_8$ | | 32H |
| $Z_9$ | | 32I |
| $Z_{10}$ | | 32J |
| $Z_1$ | | 33A |
| $Z_2$ | | 33B |
| $Z_3$ | | 33C |
| $Z_4$ | | 33D |
| $Z_5$ | | 33E |
| $Z_6$ | | 33F |
| $Z_7$ | | 33G |
| $Z_8$ | | 33H |
| $Z_9$ | | 33I |
| $Z_{10}$ | | 33J |
| $Z_1$ | | 34A |
| $Z_2$ | | 34B |
| $Z_3$ | | 34C |
| $Z_4$ | | 34D |
| $Z_5$ | | 34E |
| $Z_6$ | | 34F |
| $Z_7$ | | 34G |
| $Z_8$ | | 34H |
| $Z_9$ | | 34I |
| $Z_{10}$ | | 34J |
| $Z_1$ | | 35A |
| $Z_2$ | | 35B |
| $Z_3$ | | 35C |
| $Z_4$ | | 35D |
| $Z_5$ | | 35E |
| $Z_6$ | | 35F |
| $Z_7$ | | 35G |
| $Z_8$ | | 35H |
| $Z_9$ | | 35I |
| $Z_{10}$ | | 35J |
| $Z_1$ | | 36A |
| $Z_2$ | | 36B |
| $Z_3$ | | 36C |
| $Z_4$ | | 36D |
| $Z_5$ | | 36E |
| $Z_6$ | | 36F |
| $Z_7$ | | 36G |
| $Z_8$ | | 36H |
| $Z_9$ | | 36I |
| $Z_{10}$ | | 36J |
| $Z_1$ | | 37A |
| $Z_2$ | | 37B |
| $Z_3$ | | 37C |
| $Z_4$ | | 37D |
| $Z_5$ | | 37E |
| $Z_6$ | | 37F |
| $Z_7$ | | 37G |
| $Z_8$ | | 37H |
| $Z_9$ | | 37I |
| $Z_{10}$ | | 37J |

| | | | |
|---|---|---|---|
| 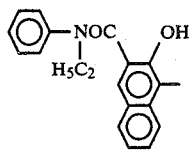 | $Z_1$ $Z_2$ $Z_3$ $Z_4$ $Z_5$ $Z_6$ $Z_7$ $Z_8$ $Z_9$ $Z_{10}$ | 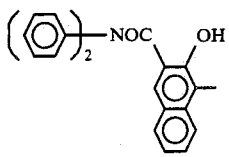 | 38A 38B 38C 38D 38E 38F 38G 38H 38I 38J |
| 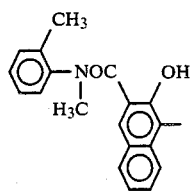 | $Z_1$ $Z_2$ $Z_3$ $Z_4$ $Z_5$ $Z_6$ $Z_7$ $Z_8$ $Z_9$ $Z_{10}$ | 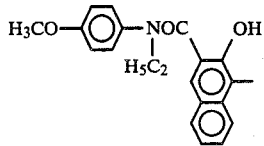 | 39A 39B 39C 39D 39E 39F 39G 39H 39I 39J |
| 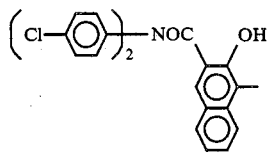 | $Z_1$ $Z_2$ $Z_3$ $Z_4$ $Z_5$ $Z_6$ $Z_7$ $Z_8$ $Z_9$ $Z_{10}$ | 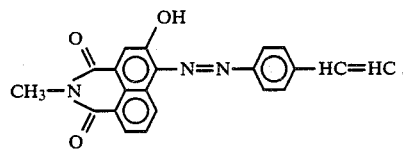 | 40A 40B 40C 40D 40E 40F 40G 40H 40I 40J |
| 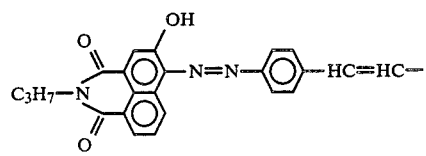 | $Z_1$ $Z_2$ $Z_3$ $Z_4$ $Z_5$ $Z_6$ $Z_7$ $Z_8$ $Z_9$ $Z_{10}$ | | 41A 41B 41C 41D 41E 41F 41G 41H 41I 41J |
| | $Z_1$ $Z_2$ $Z_3$ $Z_4$ $Z_5$ $Z_6$ $Z_7$ $Z_8$ $Z_9$ $Z_{10}$ | | 42A 42B 42C 42D 42E 42F 42G 42H 42I 42J |
| | $Z_1$ $Z_2$ $Z_3$ $Z_4$ $Z_5$ $Z_6$ $Z_7$ $Z_8$ $Z_9$ $Z_{10}$ | | 43A 43B 43C 43D 43E 43F 43G 43H 43I 43J |
| | $Z_1$ $Z_2$ $Z_3$ $Z_4$ $Z_5$ $Z_6$ $Z_7$ $Z_8$ $Z_9$ $Z_{10}$ | | 44A 44B 44C 44D 44E 44F 44G 44H 44I 44J |

| | | |
|---|---|---|
| (structure with phenyl-N-imide naphthalene-OH-azo-phenyl-CH=CH-) | $Z_1$ — $Z_{10}$ / —CH=CH—phenyl—N=N—(naphthalene-OH-imide-N-phenyl) | 45A–45J |
| (structure with benzyl-N-imide naphthalene-OH-azo-phenyl-CH=CH-) | $Z_1$ — $Z_{10}$ / —CH=CH—phenyl—N=N—(naphthalene-OH-imide-N-CH$_2$-phenyl) | 46A–46J |
| (structure with 4-chlorophenyl-N-imide naphthalene-OH-azo-phenyl-CH=CH-) | $Z_1$ — $Z_{10}$ / —CH=CH—phenyl—N=N—(naphthalene-OH-imide-N-phenyl-Cl) | 47A–47J |
| (structure with C$_2$H$_5$-N-imide naphthalene-OH-azo-phenyl-CH=CH-) | $Z_1$ — $Z_{10}$ / —CH=CH—phenyl—N=N—(naphthalene-OH-imide-N-C$_2$H$_5$) | 48A–48J |
| (structure with CH$_3$O(CH$_2$)$_2$-N-imide naphthalene-OH-azo-phenyl-CH=CH-) | $Z_1$ — $Z_{10}$ / —CH=CH—phenyl—N=N—(naphthalene-OH-imide-N-(CH$_2$)$_2$OCH$_3$) | 49A–49J |
| (structure with 3-methylphenyl-N-imide naphthalene-OH-azo-phenyl-CH=CH-) | $Z_1$ — $Z_{10}$ / —CH=CH—phenyl—N=N—(naphthalene-OH-imide-N-phenyl-CH$_3$) | 50A–50J |
| (structure with CH$_3$-N-imide naphthalene-OH-azo-phenyl-CH=CH-) | $Z_1$ — $Z_{10}$ / —CH=CH—phenyl—N=N—(naphthalene-OH-imide-N-CH$_3$) | 51A–51J |

-continued

| | | | |
|---|---|---|---|
| (structure: 1-hydroxy-naphthalimide with azo-phenyl-CH=CH-, N-(3-nitrophenyl)) | $Z_1$ through $Z_{10}$ | (structure: -CH=CH-phenyl-N=N- 1-hydroxy-naphthalimide, N-(3-nitrophenyl)) | 52A–52J |
| (pyrazole with CH$_3$, OH, N-phenyl) | $Z_1$–$Z_{10}$ | (mirror pyrazole) | 53A–53J |
| (pyrazole with CH$_3$, OH, N-(4-nitrophenyl)) | $Z_1$–$Z_{10}$ | (mirror) | 54A–54J |
| (pyrazole with CH$_3$, OH, N-(3-sulfamoylphenyl), H$_2$NO$_3$S) | $Z_1$–$Z_{10}$ | (mirror, SO$_3$NH$_2$) | 55A–55J |
| (pyrazole with CH$_3$, OH, N-(4-sulfophenyl), SO$_3$H) | $Z_1$–$Z_{10}$ | (mirror, SO$_3$H) | 56A–56J |
| (pyrazole with CH$_3$, OH, N-(4-methylphenyl), CH$_3$) | $Z_1$–$Z_{10}$ | (mirror, CH$_3$) | 57A–57J |
| (pyrazole with CH$_3$, OH, N-(4-chlorophenyl), Cl) | $Z_1$–$Z_{10}$ | (mirror, Cl) | 58A–58J |

-continued

| | | |
|---|---|---|
| HOOC-[pyrazoline ring with N-N, OH, phenyl] | $Z_1$ through $Z_{10}$ / [mirror structure with COOH] | 59A–59J |
| $H_5C_2OOC$-[pyrazoline ring with N-N, OH, phenyl] | $Z_1$ through $Z_{10}$ / [mirror structure with COOC$_2$H$_5$] | 60A–60J |
| [phenyl]-HNOCHC-—COCH$_3$ | $Z_1$ through $Z_{10}$ / —CHCONH-[phenyl] / COCH$_3$ | 61A–61J |
| H$_3$C-[phenyl]-HNOCHC-—COCH$_3$ | $Z_1$ through $Z_{10}$ / —CHCONH-[phenyl]-CH$_3$ / COCH$_3$ | 62A–62J |
| [naphthyl]-HNOCHC-—COCH$_3$ | $Z_1$ through $Z_{10}$ / —CHCONH-[naphthyl] / COCH$_3$ | 63A–63J |
| [phenyl]-NOCHC- / CH$_3$ / COCH$_3$ | $Z_1$ through $Z_{10}$ / —CHON-[phenyl] / CH$_3$ / COCH$_3$ | 64A–64J |
| ([phenyl])$_2$-NOCHC- / COCH$_3$ | $Z_1$ through $Z_{10}$ / —CHON([phenyl])$_2$ / COCH$_3$ | 65A–65J |

-continued

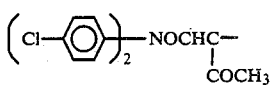

| | | |
|---|---|---|
| $Z_1$ | -CHCON(-C₆H₄-Cl)₂ COCH₃ | 66A |
| $Z_2$ | | 66B |
| $Z_3$ | | 66C |
| $Z_4$ | | 66D |
| $Z_5$ | | 66E |
| $Z_6$ | | 66F |
| $Z_7$ | | 66G |
| $Z_8$ | | 66H |
| $Z_9$ | | 66I |
| $Z_{10}$ | | 66J |

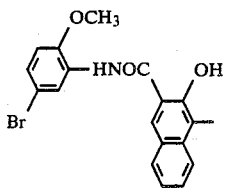

| | | |
|---|---|---|
| $Z_1$ | | 67A |
| $Z_2$ | | 67B |
| $Z_3$ | | 67C |
| $Z_4$ | | 67D |
| $Z_5$ | | 67E |
| $Z_6$ | | 67F |
| $Z_7$ | | 67G |
| $Z_8$ | | 67H |
| $Z_9$ | | 67I |
| $Z_{10}$ | | 67J |

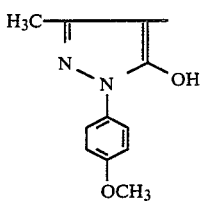

| | | |
|---|---|---|
| $Z_1$ | | 68A |
| $Z_2$ | | 68B |
| $Z_3$ | | 68C |
| $Z_4$ | | 68D |
| $Z_5$ | | 68E |
| $Z_6$ | | 68F |
| $Z_7$ | | 68G |
| $Z_8$ | | 68H |
| $Z_9$ | | 68I |
| $Z_{10}$ | | 68J |

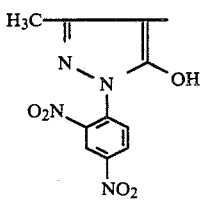

| | | |
|---|---|---|
| $Z_1$ | | 69A |
| $Z_2$ | | 69B |
| $Z_3$ | | 69C |
| $Z_4$ | | 69D |
| $Z_5$ | | 69E |
| $Z_6$ | | 69F |
| $Z_7$ | | 69G |
| $Z_8$ | | 69H |
| $Z_9$ | | 69I |
| $Z_{10}$ | | 69J |

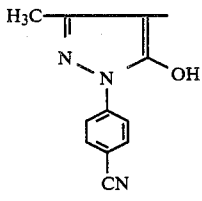

| | | |
|---|---|---|
| $Z_1$ | | 70A |
| $Z_2$ | | 70B |
| $Z_3$ | | 70C |
| $Z_4$ | | 70D |
| $Z_5$ | | 70E |
| $Z_6$ | | 70F |
| $Z_7$ | | 70G |
| $Z_8$ | | 70H |
| $Z_9$ | | 70I |
| $Z_{10}$ | | 70J |

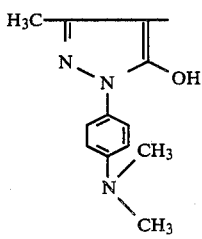

| | | |
|---|---|---|
| $Z_1$ | | 71A |
| $Z_2$ | | 71B |
| $Z_3$ | | 71C |
| $Z_4$ | | 71D |
| $Z_5$ | | 71E |
| $Z_6$ | | 71F |
| $Z_7$ | | 71G |
| $Z_8$ | | 71H |
| $Z_9$ | | 71I |
| $Z_{10}$ | | 71J |

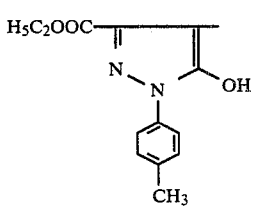

| | | |
|---|---|---|
| $Z_1$ | | 72A |
| $Z_2$ | | 72B |
| $Z_3$ | | 72C |
| $Z_4$ | | 72D |
| $Z_5$ | | 72E |
| $Z_6$ | | 72F |
| $Z_7$ | | 72G |
| $Z_8$ | | 72H |
| $Z_9$ | | 72I |
| $Z_{10}$ | | 72J |

| Structure | Z | Structure | Z | No. |
|---|---|---|---|---|
| H$_5$C$_2$OOC-[pyrazolone with N-N, OH, phenyl-OCH$_3$] | $Z_1$<br>$Z_2$<br>$Z_3$<br>$Z_4$<br>$Z_5$<br>$Z_6$<br>$Z_7$<br>$Z_8$<br>$Z_9$<br>$Z_{10}$ | [pyrazolone with COOC$_2$H$_5$, HO, N-N, phenyl-OCH$_3$] | | 73A<br>73B<br>73C<br>73D<br>73E<br>73F<br>73G<br>73H<br>73I<br>73J |
| [naphthalimide with OH, phenyl-OCH$_3$] | $Z_1$<br>$Z_2$<br>$Z_3$<br>$Z_4$<br>$Z_5$<br>$Z_6$<br>$Z_7$<br>$Z_8$<br>$Z_9$<br>$Z_{10}$ | [naphthalimide with OH, phenyl-OCH$_3$] | | 74A<br>74B<br>74C<br>74D<br>74E<br>74F<br>74G<br>74H<br>74I<br>74J |

The novel disazo compounds of this invention can be produced using known methods. For instance, bis(4-aminostyryl)naphthalene is converted into its tetrazonium salt by diazodization, and isolated in the form of such a salt having at least 300° C. of melting point. Thereafter, it is dissolved in a proper solvent, e.g., N,N-dimethylformamide, and subjected to the coupling reaction with one of compounds corresponding to the above-described pigments (e.g., couplers of naphthol AS type) in the presence of an alkali. Thus, intended compounds can be obtained with ease.

The disazo compounds of this invention can be employed as disazo pigments.

Synthetic examples of the disazo compounds of this invention are concretely described below.

Synthesis Example 1

Synthesis of Disazo Compound (1C)

To a dilute solution prepared from 40 ml of conc. hydrochloric acid and 40 ml of water, was added 15.8 g of 1,5-bis(4-aminostyryl)naphthalene. The reaction mixture was heated at 60° C. on a water bath with stirring for about 30 minutes. Thereafter, it was cooled to 0° C. and thereto, was dropwise added a solution of 6.31 g of sodium sulfite dissolved in 20 ml of water taking about 30 minutes as the temperature of the reaction system was maintained at 0° C. The stirring was then continued for 1 hour at the same temperature. The thus produced tetrazonium chloride was filtered off, and dissolved in water. The resulting water solution was united with the filtrate and thereto, was added 40 ml of 42% borofluoric acid to presipitate crystals. The crystals were filtered off, washed with a small amount of cooled water, and dried. Thus, orange red crystals of tetrazonium fluoroborate were obtained. Yield was 21 g (86%).

In 120 ml of N,N-dimethylformamide, were dissolved 2.0 g portion of the thus obtained tetrazonium salt and 1.88 g of 2-hydroxy-3-naphthoic acid anilide (as a coupler). To the reaction mixture, was dropwise added a solution containing 4 g of sodium acetate and 20 ml of water at 0° C. for about 20 minutes. Thereafter, the reaction mixture was stirred at a room temperature for about 2 hours. The thus produced precipitate was filtered off, washed with 1 liter of water, and further rinsed with 200 ml of N,N-dimethylformamide with stirring. Furthermore, the product was washed with ethanol, and dried. Thus, 2.89 g of disazo pigment corresponding to the compound (1C) was obtained. Yield 89%, Decomposition temperature 300° C. or higher.

Elemental Analysis. Anal. Calced. for C$_{60}$H$_{42}$O$_4$N$_6$: C, 79.1%; H, 4.65%; N, 9.22%. Found: C, 79.0%; H, 4.88%; N, 9.31%.

IR Absorption Spectrum (KBr tablet). Amido: 1675 cm$^{-1}$.

Visible Absorption Spectrum. Wavelength of Absorption Maximum: 540 nm (in a dichloromethane solution).

Synthesis Examples 2 to 22

The disazo compounds (2C), (3C), (4C), (5C), (11C), (13C), (15C), (25C), (26C) and (48C) were produced in the same manner as described in Synthesis Example 1 except using as couplers the compounds set forth in the following Table 1, respectively. Further, the disazo compounds (1G), (2G), (3G), (4G), (5G), (11G), (13G), (15G), (25G), (26G) and (48G) were also produced in the same manner as described in Synthesis Example 1 except that 2,3-bis(4-aminostyryl)naphthalene was used instead of 1,5-bis(4-aminostyryl)naphthalene and that, the compounds set forth in the following Table 1 were employed as couplers respectively.

The decomposition temperature, the result of elemental analysis, and the data of IR absorption spectrum and visible absorption spectrum of each of these disazo compounds are also described in Table 1.

TABLE 1

| Synthesis Example | Coupler | Disazo Compound Decomposition Temperature | Elementary Analysis | Calculated (%) | Found (%) | IR absorption spectrum $\nu_{c=o}\text{cm}^{-1}$ (KBr method) | $\lambda_{max}$:nm (in dichloromethane) |
|---|---|---|---|---|---|---|---|
| 2 | HO-naphthalene-CONH-C6H4-CH3 (o-tolyl) | (2C) (Over 300° C.) | C<br>H<br>N | 79.30<br>4.94<br>8.95 | 79.16<br>4.88<br>8.63 | 1675 | 540 |
| 3 | HO-naphthalene-CONH-C6H4-OCH3 | (3C) (Over 300° C.) | C<br>H<br>N | 76.64<br>4.77<br>8.65 | 76.95<br>4.72<br>8.36 | 1665 | 540 |
| 4 | HO-naphthalene-CONH-C6H4-Cl | (4C) (293~294° C.) | C<br>H<br>N<br>Cl | 73.54<br>4.11<br>8.57<br>7.24 | 73.44<br>4.26<br>8.89<br>7.33 | 1680 | 542 |
| 5 | HO-naphthalene-CONH-C6H4-NO2 | (5C) (Over 300°) | C<br>H<br>N | 79.50<br>5.21<br>8.95 | 79.29<br>5.21<br>8.90 | 1675 | 540 |
| 6 | HO-naphthalene-CONH-C6H3(Cl)(CH3) | (11C) (296.5~298° C.) | C<br>H<br>N<br>Cl | 73.24<br>4.51<br>8.54<br>7.21 | 73.21<br>4.66<br>8.70<br>7.29 | 1675 | 542 |

TABLE 1-continued

| Synthesis Example | Coupler | Disazo Compound Decomposition Temperature | Elementary Analysis Calculated (%) | Found (%) | IR absorption spectrum $\nu_{c=o}cm^{-1}$ (KBr method) | $\lambda$max:nm (in dichloromethane) |
|---|---|---|---|---|---|---|
| 7 | HO-naphthalene-CONH-(2,4-dimethylphenyl) | (13C) (288~289° C.) | C 79.50<br>H 5.21<br>N 8.95 | 79.48<br>5.33<br>8.63 | 1675 | 540 |
| 8 | HO-naphthalene-CONH-(2-methoxyphenyl) | (15C) (Over 300°) | C 76.64<br>H 4.47<br>N 8.65 | 76.84<br>4.42<br>8.43 | 1670 | 540 |
| 9 | HO-naphthalene-CONH-(1-naphthyl) | (25C) (Over 300° C.) | C 88.70<br>H 4.59<br>N 8.31 | 80.92<br>4.71<br>8.07 | 1675 | 538 |
| 10 | HO-naphthalene-CONH-(2-naphthyl) | (26C) (Over 300° C.) | C 80.77<br>H 4.59<br>N 8.31 | 81.02<br>4.61<br>8.22 | 1670 | 538 |
| 11 | OH-naphthalimide, N-C₂H₅ | (48C) (Over 300° C.) | C 77.59<br>H 4.42<br>N 9.69 | 77.68<br>4.43<br>9.94 | 1690 | 535 |

TABLE 1-continued

| Synthesis Example | Coupler | Disazo Compound Decomposition Temperature | Elementary Analysis | Calculated (%) | Found (%) | IR absorption spectrum $\nu_{c=o}$cm$^{-1}$ (KBr method) | λmax:nm (in dichloromethane) |
|---|---|---|---|---|---|---|---|
| 12 | HO–[naphthyl]–CONH–[phenyl] | (1G) (243~246° C.) | C H N | 79.1 4.65 9.22 | 79.2 4.81 9.15 | 1675 | 535 |
| 13 | HO–[naphthyl]–CONH–[phenyl-CH₃] | (2G) (230~242° C.) | C H N | 79.30 4.94 8.95 | 79.22 4.66 8.75 | 1670 | 533 |
| 14 | HO–[naphthyl]–CONH–[phenyl]–OCH₃ | (3G) (246~248° C.) | C H N | 76.64 4.77 8.65 | 76.32 4.73 8.80 | 1675 | 534 |
| 15 | HO–[naphthyl]–CONH–[phenyl]–Cl | (4G) (248~250° C.) | C H N Cl | 73.54 4.11 8.57 7.24 | 73.50 4.18 8.76 7.33 | 1670 | 543 |
| 16 | HO–[naphthyl]–CONH–[phenyl-NO₂] | (5G) (255~257° C.) | C H N | 79.50 5.21 8.95 | 79.28 5.22 8.64 | 1680 | 546 |

TABLE 1-continued

| Synthesis Example | Coupler | Disazo Compound Decomposition Temperature | Elementary Analysis Calculated (%) | Elementary Analysis Found (%) | IR absorption spectrum $\nu_{c=o}cm^{-1}$ (KBr method) | λmax:nm (in dichloromethane) |
|---|---|---|---|---|---|---|
| 17 | HO-naphthyl-CONH-C₆H₃(CH₃)(Cl) | (11G) (245~248° C.) | C 73.24<br>H 4.51<br>N 8.54<br>Cl 7.21 | 73.36<br>4.58<br>8.82<br>7.25 | 1675 | 543 |
| 18 | HO-naphthyl-CONH-C₆H₃(CH₃)(CH₃) | (13G) (229~235° C.) | C 79.50<br>H 5.21<br>N 8.95 | 79.64<br>5.27<br>8.99 | 1675 | 533 |
| 19 | HO-naphthyl-CONH-C₆H₄(OCH₃) | (15C) (243~245° C.) | C 76.64<br>H 4.47<br>N 8.65 | 76.60<br>4.41<br>8.37 | 1670 | 534 |
| 20 | HO-naphthyl-CONH-naphthyl | (25G) (249~257° C.) | C 80.77<br>H 4.59<br>N 8.31 | 80.65<br>4.62<br>8.31 | 1670 | 534 |
| 21 | HO-naphthyl-CONH-naphthyl | (26G) (248~253° C.) | C 80.77<br>H 4.59<br>N 8.31 | 80.74<br>4.69<br>8.05 | 1675 | 534 |

TABLE 1-continued

| Synthesis Example | Coupler | Disazo Compound Decomposition Temperature | Elementary Analysis Calculated (%) | | Found (%) | IR absorption spectrum $\nu_{c=o}\text{cm}^{-1}$ (KBr method) | λmax:nm (in dichloromethane) |
|---|---|---|---|---|---|---|---|
| 22 | (structure: naphthalene with OH and N(C₂H₅) imide) | (48C) (250~255° C.) | C | 77.59 | 77.81 | 1695 | 550 |
|   |   |   | H | 4.42 | 4.07 |   |   |
|   |   |   | N | 9.69 | 9.34 |   |   |

Synthesis Example 23

Synthesis of Disazo Compound (1I)

To a dilute solution prepared from 2 ml of conc. hydrochloric acid and 5 ml of water, was added 1.98 g of 1,4-bis(4-aminostyryl)naphthalene. The reaction mixture was thoroughly stirred for about 30 minutes and then cooled to 0° C. Thereto, a solution of 760 mg of sodium sulfite in 3 ml or water was dropwise added at 0° C. for about 30 minutes. Thereafter, the stirring was continued for about 30 minutes at the same temperature. A small amount of unreacted matter was filtered out, and to the filtrate was added 3 ml of 42% borofluoric acid. The crystals thus precipitated were filtered off, washed with a small amount of cooled water, and dried to obtain 2.53 g of dark red crystals of tetrazonium fluoroborate. Yield was 83%.

In 12 ml of N,N-dimethylformamide, were dissolved 359 mg portion of the thus obtained tetrazonium salt and 337 mg of 2-hydroxy-3-naphthoic acid anilide. Thereto, a solution containing 500 mg of sodium acetate and 2 ml of water was dropwise added at 0° C. taking about 20 minutes, and then stirred at a room temperature for about 2 hours. The crystals thus precipitated were filtered off; washed with water, and treated with 100 ml of N,N-dimethylformamide with stirring. The precipitate produced was filtered off again, washed with ethanol, and dried. Thus, 512 mg of disazo pigment of the compound (1I) was obtained.

Yield 88%, Decomposition temperature 283° C.

Elemental Analysis. Anal. Calcd. for $C_{60}H_{42}O_4N_6$: C, 79.1%; H, 4.65%; N, 9.22%. Found: C, 79.2%; H, 4.66%; N, 9.50%.

IR Absorption Spectrum (KBr tablet). Amido: 1670 $\text{cm}^{-1}$.

Visible Absorption Spectrum. Wavelength of Absorption Maximum: 540 nm (in a dichloromethane solution).

Synthesis Examples 24 to 29

The disazo compounds (3I), (7I), (8I), (13I), (25I) and (26I) were produced in the same manner as described in Synthesis Example 23 except changing the coupling components respectively. The decomposition temperature, the result of elemental analysis and the data of IR and visible absorption spectra of each of these disazo compounds are described in Table 2.

TABLE 2

| Synthesis Example | Disazo Compound (Decomposition Temperature) | | Elementary Analysis Calculated (%) | Found (%) | IR absorption spectrum $\nu_{c=o}\text{cm}^{-1}$ (KBr method) | λmax:nm (in dichloromethane) |
|---|---|---|---|---|---|---|
| 24 | (3I) (Over 300° C.) | C | 76.64 | 71.97 | 1680 | 560 |
|    |                    | H | 4.77  | 4.87  |      |     |
|    |                    | N | 8.65  | 8.68  |      |     |
| 25 | (7I) (Over 300° C.) | C | 71.99 | 72.00 | 1670 | 556 |
|    |                    | H | 4.03  | 4.13  |      |     |
|    |                    | N | 11.19 | 12.20 |      |     |
| 26 | (8I) (Over 300° C.) | C | 79.30 | 79.12 | 1675 | 541 |
|    |                    | H | 4.94  | 5.07  |      |     |
|    |                    | N | 8.95  | 8.94  |      |     |
| 27 | (13I) (275° C.)    | C | 79.50 | 79.11 | 1675 | 550 |
|    |                    | H | 5.21  | 5.19  |      |     |
|    |                    | N | 8.68  | 8.51  |      |     |
| 28 | (25I) (297° C.)    | C | 80.77 | 80.59 | 1675 | 559 |
|    |                    | H | 4.59  | 4.51  |      |     |
|    |                    | N | 8.31  | 8.59  |      |     |
| 29 | (26I) (263° C.)    | C | 80.77 | 80.76 | 1675 | 554 |
|    |                    | H | 4.59  | 4.67  |      |     |
|    |                    | N | 8.31  | 8.40  |      |     |

Synthesis Example 30

Synthesis of Disazo Compound (1J)

To a dilute solution prepared from 5 ml of conc. hydrochloric acid and 5 ml of water, was added 2.20 g of 2,6-bis(4-aminostyryl)naphthalene. The reaction mixture was stirred thoroughly on a 60° C. water bath for about 30 minutes. Thereafter, it was cooled to 0° C. and thereto, was dropwise added a solution of 881 mg of sodium sulfite in 3 ml of water taking about 30 minutes at 0° C. Then the stirring was continued for 1 hour at the same temperature. The thus produced tetrazonium chloride was filtered off, and dissolved in water, The resulting water solution was united with the filtrate and thereto, was added 6 ml of 42% borofluoric acid to precipitate crystals. The crystals were filtered off, washed with a small amount of cooled water, and dried. Thus, orange red crystals of tetrazonium fluoroborate was obtained. Yield was 2.97 g (87%).

In 12 ml of N,N-dimethylformamide, ware dissolved 280 mg portion of the thus obtained tetrazonium salt and 263 mg of 2-hydroxy-3-naphthoic acid anilide (as a coupler). To the reaction mixture, was dropwise added a solution containing 500 mg of sodium acetate and 2 ml of water at 0° C. for about 20 minutes. Thereafter, the reaction mixture was stirred at a room temperature for about 2 hours. The thus produced precipitate was filtered off, washed with 200 ml of water, and rinsed with 100 ml of N,N-dimethylformamide with stirring. Further, the product was washed with ethanol, and dried. Thus, 410 mg of disazo pigment corresponding to the compound (1J) was obtained. Yield 90%, Decomposition temperature 300° C. or higher.

Elemental Analysis. Anal. Calcd. for $C_{60}H_{42}O_4N_6$: C, 79.1%; H, 4.65%; N, 9.22%. Found: C, 79.3%; H, 4.71%; N, 9.43%.

IR Absorption Spectrum (KBr tablet). Amido: 1680 $cm^{-1}$.

Visible Absorption Spectrum. Wavelength of Absorption Maximum: 543 nm (in a dichloromethane solution).

Synthesis Examples 31 to 40

The disazo compounds (2J), (3J), (4J), (5J), (11J), (13J), (15J), (25J) and (26J) were produced in the same manner as described in Synthesis Example 30 except using as couplers the compounds set forth in Table 3, respectively. The decomposition temperature, the result of elemental analysis and the data of IR and visible absorption spectra of each of these disazo compounds are described in Table 3.

TABLE 3

| Synthesis Example | Coupler | Disazo Compound (Decomposition Temperature) | Elementary Analysis Calculated (%) | Found (%) | IR absorption spectrum $v_{c=o} cm^{-1}$ (KBr method) | λmax:nm (in dichloromethane) |
|---|---|---|---|---|---|---|
| 31 | OH, CONH-C6H4-CH3 (naphthol) | (2J) (Over 300° C.) | C 79.30<br>H 4.94<br>N 8.95 | 79.62<br>5.05<br>8.71 | 1675 | 658 |
| 32 | OH, CONH-C6H4-OCH3 (naphthol) | (3J) (Over 300° C.) | C 76.64<br>H 4.77<br>N 8.65 | 76.38<br>4.88<br>8.39 | 1670 | 552 |
| 33 | OH, CONH-C6H4-Cl (naphthol) | (4J) (Over 300° C.) | C 73.54<br>H 4.11<br>N 8.57<br>Cl 7.24 | 73.81<br>4.29<br>8.70<br>7.28 | 1680 | 536 |
| 34 | OH, CONH-C6H4-NO2 (naphthol) | (5J) (Over 300° C.) | C 71.99<br>H 4.03<br>N 11.19 | 72.20<br>4.08<br>11.03 | 1680 | 548 |

TABLE 3-continued

| Synthesis Example | Coupler | Disazo Compound (Decomposition Temperature) | Elementary Analysis Calculated (%) | Found (%) | IR absorption spectrum $\nu_{c=o}\text{cm}^{-1}$ (KBr method) | λmax:nm (in dichloromethane) |
|---|---|---|---|---|---|---|
| 35 | 3-hydroxy-2-naphthoic acid 2,4-dimethylanilide | (13J) (293° C.) | C 79.50<br>H 5.21<br>N 8.95 | 79.71<br>5.28<br>8.88 | 1675 | 548 |
| 36 | 3-hydroxy-2-naphthoic acid o-toluidide | (15J) (Over 300° C.) | C 76.64<br>H 4.47<br>N 8.65 | 76.83<br>4.53<br>8.48 | 1675 | 557 |
| 37 | 3-hydroxy-2-naphthoic acid 1-naphthylamide | (25J) (Over 300° C.) | C 80.77<br>H 4.59<br>N 8.31 | 80.58<br>4.73<br>8.53 | 1680 | 658 |
| 38 | 3-hydroxy-2-naphthoic acid 2-naphthylamide | (26J) (Over 300° C.) | C 80.77<br>H 4.59<br>N 8.31 | 80.93<br>4.66<br>8.28 | 1675 | 545 |
| 39 | 3-hydroxy-2-naphthoic acid 4-chloro-2-methylanilide | (11J) (303° C.) | C 73.24<br>H 4.51<br>N 8.54<br>Cl 7.21 | 73.38<br>4.58<br>8.35<br>7.10 | 1675 | 556 |
| 40 | N-ethyl-5-hydroxy-naphthalimide | (48J) (271° C.) | C 77.59<br>H 4.42<br>N 9.69 | 77.52<br>4.09<br>9.83 | 1695<br>1660 | 545 |

Figure 2:
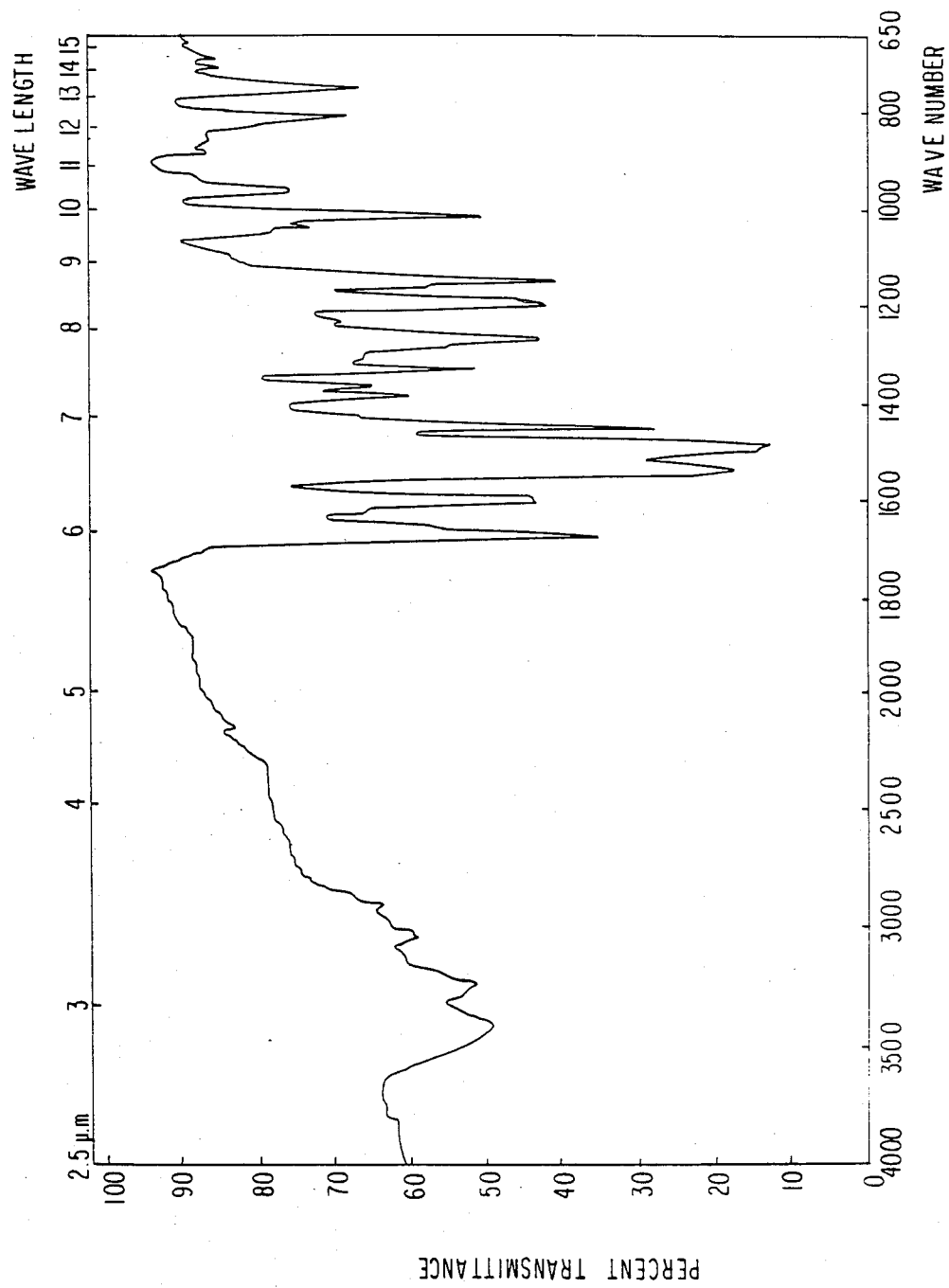
Figure 3:
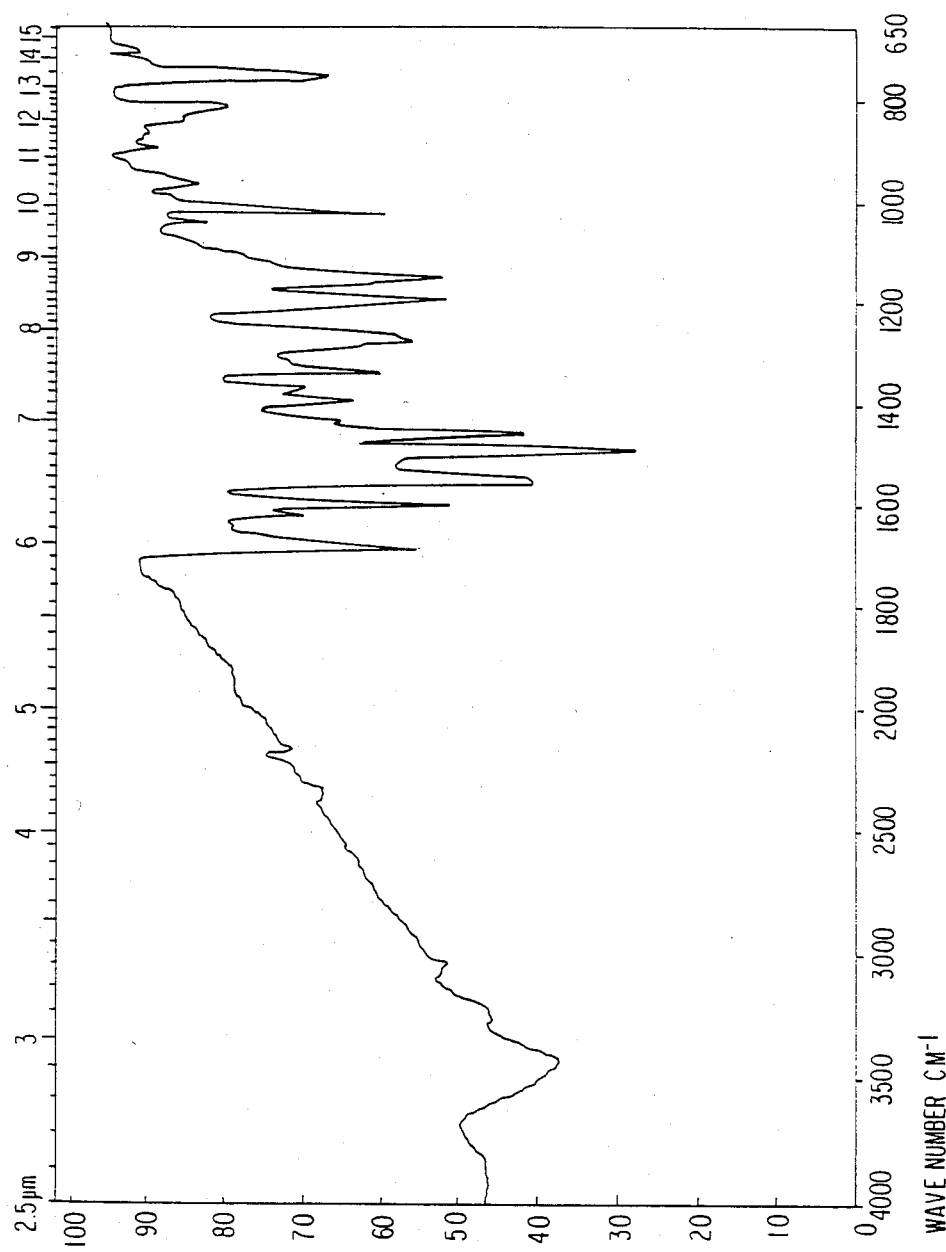
Figure 4:
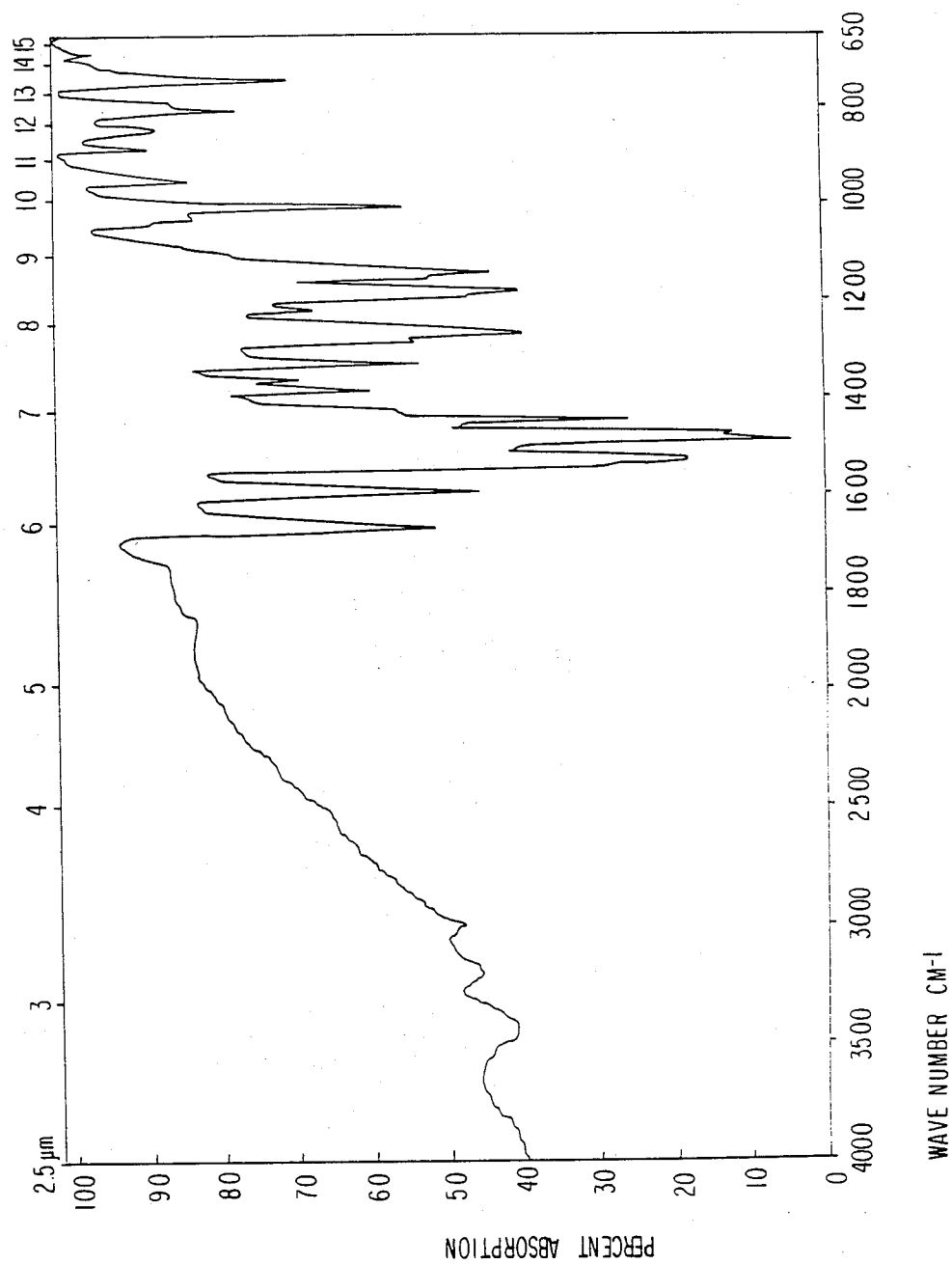

Infrared absorption spectra (KBr process) of the disazo compounds (2C), (11G), (2I) and (15J) are shown in FIG. 1, FIG. 2, FIG. 3 and FIG. 4, respectively.

Other disazo compounds were also produced according to the same methods employed in a above-described synthesis examples by changing the couplers used.

An electrophotographic photoreceptor of this invention has an electrophotographic photoreceptive layer containing one or more of the disazo compound represented by the above-described general formula (I). Electrophotographic photoreceptors having various types of constructions have so far been known, and the electrophotographic photoreceptor of this invention may have any of these types of constructions. However, it is generally advantageous to have one of the constructions described below.

(1) An electrophotographic photoreceptive layer containing a disazo compound dispersed in a binder or a charge carrier transporting medium is provided on a conductive support.

(2) A charge carrier generating layer containing a disazo compound as a main component is provided on a conductive support, and further a charge carrier transporting medium layer is provided on the charge carrier generating layer.

The disazo compounds of this invention function as photoconductive substances, and generate charge carriers with extremely high efficiencies when they absorb light. The charge carriers generated can be transported using the disazo compounds as a medium. However, it is more effective to transport the charge carriers using charge carrier transporting compounds as a medium.

Electrophotographic photoreceptors having the constructions of type (1) can be prepared by dispersing fine grains of the disazo compounds into biner solutions or solutions containing both charge carrier transporting compounds and binders, coating the resulting dispersions on conductive supports, and drying them. Therein, thicknesses of the thus formed electrophotographic photoreceptive layers may be adjusted to 3 to 30 microns, preferably 5 to 20 microns.

Electrophotographic photoreceptors having the constructions of the type (2) can be prepared by evaporating thin films of the disazo compounds onto conductive supports under vacuum; or coating on conductive supports solutions of the disazo compounds dissolved in proper solvents like amines, or coating on conductive supports dispersions of fine grains of the disazo compounds dispersed in proper solvents or solutions containing proper binders in proper solvents, and then drying them; and thereon, coating solutions containing charge carrier transporting compounds and binders, and then drying them. Therein, thicknesses of the disazo compound-containing layers which function as charge carrier generating layers may be 4 microns or less, preferably 2 microns or less, and those of charge carrier transporting medium layers may range from 3 to 30 microns, preferably 5 to 20 microns.

In using the disazo compounds for production of photoreceptors of the types (1) and (2), they are ground to fine grains having sizes of 5 microns or less, preferably 2 microns or less, by means of dispersing machines, such as a ball mill, a sand mill, a vibration mill and the like.

When the disazo compounds are employed in photoreceptors of the type (1), if the amount of the disazo compounds in electrophotographic photoreceptive layers is too low it can cause reduction in photosensitivity, whereas too much can cause deterioration of charging characteristics and reduction in the strength of the electrophotographic photoreceptive layer. Therefore, the content of the disazo compound in the electrophotographic photoreceptive layer is 0.01 to 2 times, preferably 0.05 to 1 time, that of the binder therein by weight. The content of the charge carrier transporting compound incorporated optionally in the electrophotographic photoreceptive layer is 0.1 to 2 times, preferably 0.3 to 1.3 times, that of the binder therein by weight. On the occasion that a charger carrier transporting compound which itself can also act as a binder is employed, the amount of the disazo compound is 0.01 to 0.5 times by weight that of a binder used therein.

When the disazo compound is employed in forming a disazo compound-containing layer functioning as a charge carrier generating layer in an electrophotographic photoreceptor of the type (2) using a coating technique, a preferably content of the disazo compound is one or more times that of a binder used therein by weight. If the content of the disazo compound is lower than the above-described ones, sufficient photosensitivity can not be attained. In the charge carrier transporting medium, the content of charge carrier transporting compound is 0.2 to 2 times, preferably 0.3 to 1.3 times, that of a binder used therein by weight. On the occasion that charge carrier transporting macromolecular compounds, which themselves can function as binders, are employed, other binders may be dispensed with.

When producing electrophotographic photoreceptors of this invention, additives like a plasticizer, a sensitizer or so on may be used together with a binder.

Suitable examples of a conductive support which can be used in the electrophotographic photoreceptor of this invention include plates of metals such as aluminium, copper, zinc and so on; films or sheets of plastics like polyesters on which conductive materials such as aluminium, $SnO_2$ and so on are evaporated, or dispersions thereof are coated; and paper to which conductivity is imparted.

Suitable examples of a binder which can be used in the electrophotographic photoreceptor of this invention include condensed resins such as polyamides, polyurethanes, polyesters, epoxy resins, polyketones, polycarbonates, etc.; and vinyl polymers such as polyvinyl ketones, polystyrenes, poly-N-vinylcarbazoles, polyacrylamides, etc. In addition, resins having both insulating property and adhesiveness can be used.

Suitable examples of a plasticizer which can be used in the electrophotographic photoreceptor of this invention include biphenyl, biphenyl chloride, o-terphenyl, p-terphenyl, dibutyl phthalate, dimethylglycol phthalate, dioctyl phthalate, triphenyl phosphate, methylnaphthalene, benzophenone, chlorinated paraffin, polypropylene, polystyrene, dilaurylthiodipropionate, 3,5-dinitrosalicyclic acid, various fluorohydrocarbons, and so on.

Besides of them, silicone oils and the like may be used for the purpose of improving upon surface properties of the electrophotographic photoreceptor.

Suitable examples of a sensitizer which can be used in the electrophotographic photoreceptor of this invention include chloranil, tetracyanoethylene, Methyl Violet, Rhodamine B, cyanine dyes, merocyanine dyes, pyrylium dyes, thiapyrylium dyes and so on.

Charge carrier transporting compounds are divided into two groups, one of electron transporting compounds, and the other is positive hole transporting compounds. Both of them can be employed in the electrophotographic photoreceptors of this invention. Examples of an electron transporting compounds include compounds having electron attractive groups, such as 2,4,7-trinitro-9-fluorenone, 2,4,5,7-tetranitro-9-fluorenone, 9-dicyanomethylene-2,4,7-trinitrofluorenone, 9-dicyanomethylene-2,4,5,7-tetranitrofluorene, tetranitrocarbazole chloranil, 2,3-dichloro-5,6-dicyanobenzoquinone, 2,4,7-trinitro-9,10-phenanthrenequinone, tetrachlorophthalic anhydride, tetracyanoethylene, and tetracyanoquinonedimethane.

Examples of a positive hole transporting compounds include compounds having electron donative groups which may be grouped into, e.g., two classes, one includes macromolecular compounds such as (1) polyvinylcarbazole and derivatives thereof, as described in Japanese Patent Publication No. 10966/59; (2) vinyl polymers like polyvinyl pyrene, polyvinyl anthracene, poly-2-vinyl-4-(4'-dimethylaminophenyl)-5-phenyloxazole, poly-3-vinyl-N-ethyl carbazole, etc., as described in U.S. Pat. Nos. 3,232,755 and 3,162,532; (3) polymers like polyacenaphthylene, polyindene, acenaphthylene-styrene copolymer, etc., as described in Japanese Patent Publication No. 19193/68; and (4) condensed resins such as pyrene-formaldehyde resin, bromopyreneformaldehyde resin, ethylcarbazole-formaldehyde resin, etc., as described in published examined Japanese Patent Application No. 13940/81; (5) triphenylmethane polymers, as described in published unexamined Japanese Patent Applications Nos. 90833/81 and 161550/81; and the other include low molecular weight compounds, such as (6) triazole derivatives as described in U.S. Pat. No. 3,112,197 and so on; (7) oxadiazole derivatives as described in U.S. Pat. No. 3,189,447 and so on; (8) imidazole derivatives as described in published examined Japanese Patent Application No. 16096/52 and so on; (9) polyarylalkane derivatives as described in U.S. Pat. Nos. 3,615,402; 3,820,989; 3,542,544; and 3,542,547; Japanese Patent Publication No. 10983/76; U.S. Pat. No. 4,127,412; Japanese Patent Applications Nos. 88272/78 and 78968/79; published unexamined Japanese Patent Applications Nos. 108667/80, 156953/80 and 36656/81; and so on; (10) pyrazoline derivatives and pyrazolone derivatives, as described in U.S. Pat. Nos. 3,824,099 and 3,180,729; Japanese Patent Application No. 75854/78; published unexamined Japanese Patent Application Nos. 88064/80, 88065/80, 51086/80, 80051/81, 88141/81, 45545/82, 112637/79 and 74546/80; and so on; (11) phenylenediamine derivatives, as described in U.S. Pat. No. 3,615,404; Japanese Patent Publication No. 10105/76; published unexamined Japanese Patent Applications Nos. 83435/79, 110836/79 and 119925/79; Japanese Patent Publications Nos. 3712/71 and 28336/72; and so on; (12) arylamine derivatives, as described in U.S. Pat. No. 3,567,450; published examined Japanese Patent Application No. 35702/74; German Patent (DAS) No. 1,110,518; U.S. Pat. Nos. 3,180,703; 3,240,597; 3,658,520; 4,232,103; 4,175,961 and 4,012,376; published unexamined Japanese Patent Applications Nos. 144250/80 and 119132/81; Japanese Patent Publication No. 27577/64; published unexamined Japanese Patent Application No. 22437/81; and so on; (13) amino substituted chalcone derivatives, as described in U.S. Pat. No. 3,526,501 and so on; (14) N,N-bicarbazyl derivatives, as described in U.S. Pat. No. 3,542,546 and so on; (15) oxazole derivatives, as described in U.S. Pat. No. 3,257,203 and so on; (16) styrylanthracene derivatives, as described in published unexamined Japanese Patent Application No. 46234/81 and so on; (17) fluorenone derivatives, as described in published unexamined Japanese Patent Application No. 110837/79 and so on; and (18) hydrazone derivatives, as described in U.S. Pat. Nos. 3,717,462 and 4,338,388; published unexamined Japanese Patent Application No. 59143/79 (corresponding to U.S. Pat. No. 4,150,987); published unexamined Japanese Patent Applications Nos. 52064/80, 46760/80 and 64244/82, U.S. Ser. Nos. 276,745 and 357,112; and so on.

It should be noted that this invention does not restrict the charge carrier transporting compound to the above-described compounds belonging to the groups (1) to (18), and can use any compounds known as charge carrier transporting compounds. These charge transporting materials can be optionally used in a combination of two or more thereof.

In the photoreceptors obtained in the abovedescribed manners, an adhesive layer or a barrier layer can be optionally provided between the conductive support and the photoreceptive layer. Suitable examples of materials which can be used for such layers include polyamides, nitrocellulose, aluminium oxide and so on, and suitable thicknesses of these layers are 1 $\mu$m or less.

The electrophotographic photoreceptors of this invention, which are described above in detail, generally have characteristics of high photosensitivity an- high durability.

The electrophotographic photoreceptors of this invention have wide applications to electrophotographic copying machines, photoreceptors for printers using laser or a cathod ray tube as a light source, and other arts.

The photoconductive compositions containing diazo compounds of this invention can be employed as the photoconductive layer of an image pickup tube for a video camera, or the photoconductive layer of a solid state image pickup element which has a photoreceptive layer (photoconductive layer) provided extending over the entire surface of known one-dimentionally or two-dimentionally arranged semiconductor circuit which performs transfer and scanning of signals. In addition, they can be employed as the photoconductive layer for a solar cell, as described in A. K. Ghosh and Tom Feng, *J. App. Phys.*, 49(12) 5982 (1978).

Further, on the occasion that the trisazo compounds of this invention are dispersed into the solutions of alkali soluble resins like phenol resins together with the above-described charge carrier transporting compounds such as oxadiazole derivatives, hydrazone derivatives and so on, coated on conductive supports like aluminium plates, dried, and subjected to in sequence imagewise exposure, toner development and etching with an alkaline solution, as described in published examined Japanese Patent Application No. 17162/62, published unexamined Japanese Patent Applications Nos. 19063/80 and 161250/80 and U.S. Ser. No. 356,541, not only printing plates having high resolutions, high durabilities and high photosensitivities but also printed circuits can be made.

This invention will now be illustrated in greater detail by reference to the following examples. However, this invention should not be construed as being limited to the following examples. Additionally, all parts are by weight unless otherwise indicated.

EXAMPLE 1

One part of the disazo compound (1G), 5 parts of 4,4'-bis(diethylamino)-2,2'-dimethyltriphenylmethane and 5 parts of polycarbonate of bisphenol A were added to 95 parts of dichloromethane, and the resulting matter was ground and mixed in a ball mill to prepare a coating compostion. The coating composition was coated on a conductive transparent support (a 100 μm-thick polyethylene terephthalate film on the surface of which an indium oxide evaporated layer was provided, and which had surface resistance of $10^3$ Ω) in a dry thickness of about 8 μm using a wire wound rod. Thus, an electrophotographic photoreceptor having a single layer type electrophotographic photoreceptive layer was produced.

This electrophotographic photoreceptor was charged so as to gain a surface potential of +400 V through corona discharge at +5 KV using an electrostatic copying paper testing apparatus (made by Kawaguchi Denki Co., Ltd. Model SP-428), and exposed by means of a tungsten lamp having a color temperature of 3,000° K. placed at such a distance that illumination density at the surface of the photoreceptor may become 4 lux and therethrough, the time at which the surface potential was reduced to one-half its initial value was measured. The thus determined half decay exposure $E_{50}$ (lux·sec) was 70 (lux·sec). After the two steps, charging and exposure, were repeated 3,000 times, change in the value of $E_{50}$ was hardly observed.

EXAMPLES 2 to 81

Electrophotographic photoreceptors having the single layer structure were made in the same manner as described in Example 1 except using in place of disazo compound (1G) other disazo compounds (1A), (2A), (3A), (4A), (5A), (11A), (13A), (48A), (53A), (61A), (1B), (2B), (3B), (4B), (5B), (25B), (26B), (49B), (54B), (62B), (1C), (3C), (5C), (11C), (13C), (25C), (48C), (55C), (63C), (1D), (2D), (4D), (5D), (13D), (18D), (26D), (49D), (56D), (64D), (1E), (2E), (5E), (11E), (13E), (19E), (29E), (44E), (57E), (65E), (1F), (3F), (5F), (11F), (13F), (26F), (29F), (45F), (53F), (61F), (2G), (3G), (4G), (5G), (11G), (13G), (25G), (26G), (48G), (54G), (62G), (1H), (3H), (5H), (8H), (23H), (25H), (47H), (57H) and (63H), respectively. Half decay exposure of each of these phtoreceptors upon positive charging was determined. The values obtained are shown in Table 4.

TABLE 4

| Example | Disazo Compound | $E_{50}$ [lux·sec] | Example | Disazo Compound | $E_{50}$ [lux·sec] |
|---|---|---|---|---|---|
| 2 | (1A) | 60.1 | 42 | (1E) | 17.6 |
| 3 | (2A) | 38.2 | 43 | (2E) | 29.3 |
| 4 | (3A) | 36.5 | 44 | (5E) | 29.1 |
| 5 | (4A) | 34.0 | 45 | (11E) | 45.0 |
| 6 | (5A) | 66.7 | 46 | (13E) | 80.2 |
| 7 | (11A) | 76.0 | 47 | (19E) | 83.2 |
| 8 | (13A) | 54.7 | 48 | (29E) | 77.8 |
| 9 | (48A) | 91.5 | 49 | (44E) | 21.0 |
| 10 | (53A) | 66.6 | 50 | (57E) | 97.5 |
| 11 | (61A) | 141 | 51 | (65E) | 42.7 |
| 12 | (1B) | 32.5 | 52 | (1F) | 75.8 |
| 13 | (2B) | 35.1 | 53 | (3F) | 54.8 |
| 14 | (3B) | 11.0 | 54 | (5F) | 38.5 |
| 15 | (4B) | 40.1 | 55 | (11F) | 98.1 |
| 16 | (5B) | 75.9 | 56 | (13F) | 95.7 |
| 17 | (25B) | 72.2 | 57 | (26F) | 86.5 |
| 18 | (26B) | 78.8 | 58 | (29F) | 27.4 |
| 19 | (49B) | 57.5 | 59 | (45F) | 90.2 |
| 20 | (54B) | 84.3 | 60 | (53F) | 69.9 |
| 21 | (62B) | 72.4 | 61 | (61F) | 15.3 |
| 22 | (1C) | 56.1 | 62 | (2G) | 95.2 |
| 23 | (3C) | 30.7 | 63 | (3G) | 83.9 |
| 24 | (4C) | 13.4 | 64 | (4G) | 45.2 |
| 25 | (5C) | 61.2 | 65 | (5G) | 66.4 |
| 26 | (11C) | 9.0 | 66 | (11G) | 60.1 |
| 27 | (13C) | 24.9 | 67 | (13G) | 83.2 |
| 28 | (25C) | 141.1 | 68 | (25G) | 70.2 |
| 29 | (48C) | 3.0 | 69 | (26G) | 84.3 |
| 30 | (55C) | 55.2 | 70 | (48G) | 50.4 |
| 31 | (63C) | 248 | 71 | (54G) | 85.1 |
| 32 | (1D) | 13.3 | 72 | (62G) | 95.3 |
| 33 | (2D) | 73.1 | 73 | (1H) | 28.8 |
| 34 | (4D) | 52.2 | 74 | (3H) | 36.9 |
| 35 | (5D) | 8.6 | 75 | (5H) | 96.5 |
| 36 | (13D) | 12.1 | 76 | (8H) | 43.3 |
| 37 | (18D) | 43.6 | 77 | (23H) | 68.9 |
| 38 | (26D) | 64.3 | 78 | (25H) | 73.0 |
| 39 | (49D) | 4.5 | 79 | (47H) | 81.0 |
| 40 | (56D) | 66.2 | 80 | (57H) | 51.4 |
| 41 | (64D) | 95.0 | 81 | (63H) | 48.7 |

EXAMPLE 82

Both 5 g of the diazo compound (2G) and a solution of a 2 g of polyvinyl butyral resin (butyralation degree: 63 mol%) dissolved in 100 ml of ethanol were placed in a ball mill, and dispersed for 20 hours. The resulting mixture was coated on a conductive transparent support (a 100 μm-thick polyethylene terephthalate film on the surface of which an aluminium evaporated film was provided using a wire wound rod, and which had surface resistance of $10^3$ Ω), and dried. Thus, a charge generating layer having a dry thickness of 1 μm was formed.

Next, on the charge generating layer, was coated a solution containing 2 parts of p-(diphenylamino)benzaldehyde-N'-methyl-N'-phenylhydrazone

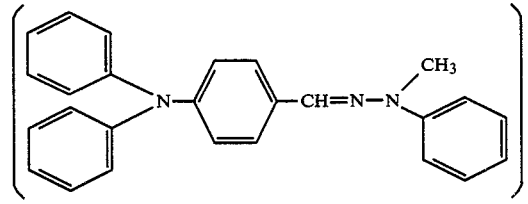

and 4 parts of polycarbonate of bisphenol A dissolved in 60 parts of dichloromethane in a dry thickness of 8 μm using a wire wound rod to form a charge transporting layer. Thus, an electrophotographic photoreceptor having an electrophotographic photoreceptive layer constructed by the above-described two layers was obtained.

After this photoreceptor was charged so as to gain surface potential of −400 V by means of −5 KV corona discharge, half decay exposure was measured. $E_{50}$ of this photoreceptor was 15 (lux·sec).

EXAMPLES 83 to 146

Electrophotographic photoreceptors having a double layer structure was made in the same manner as described in Example 82 except using in place of the disazo compound (2G) other disazo compounds (1A), (3A), (5A), (7A), (12A), (43A), (54A), (62A), (1B), (2B), (15B), (17B), (27B), (45B), (56B), (61B), (2C), (4C), (6C), (10C), (37C), (48C), (55C), (64C), (1D), (4D), (5D), (8D), (25D), (46D), (57D), (63D), (1E), (2E), (7E), (16E), (29E), (47E), (53E), (65E), (2F), (3F), (9F), (12F), (38F), (49F), (58F), (66F), (1G), (18G), (19G), (39G), (48G), (60G), (61G), (2H), (4H), (6H), (7H), (18H), (49H), (56H) and (63H), respectively. Half decay exposure $E_{50}$ of each of these photoreceptors was measured. Results obtained are shown in Table 5.

TABLE 5

| Example | Disazo Compound | $E_{50}$ (lux · sec) |
|---|---|---|
| 83 | (1A) | 92.8 |
| 84 | (3A) | 30.1 |
| 85 | (5A) | 65.2 |
| 86 | (7A) | 81.4 |
| 87 | (12A) | 68.9 |
| 88 | (43A) | 30.9 |
| 89 | (54A) | 147 |
| 90 | (62A) | 62.9 |
| 91 | (1B) | 63.2 |
| 92 | (2B) | 98.0 |
| 93 | (15B) | 8.5 |
| 94 | (17B) | 42.4 |
| 95 | (27B) | 6.7 |
| 96 | (45B) | 68.4 |
| 97 | (56B) | 24.8 |
| 98 | (61B) | 61.6 |
| 99 | (2C) | 19.2 |
| 100 | (4C) | 9.8 |
| 101 | (6C) | 87.4 |
| 102 | (10C) | 25.6 |
| 103 | (37C) | 41.3 |
| 104 | (48C) | 2.0 |
| 105 | (55C) | 96.9 |
| 106 | (64C) | 44.6 |
| 107 | (1D) | 48.1 |
| 108 | (4D) | 6.0 |
| 109 | (5D) | 98.5 |
| 110 | (8D) | 34.9 |
| 111 | (25D) | 34.9 |
| 112 | (46D) | 13.6 |
| 113 | (57D) | 69.5 |
| 114 | (63D) | 36.3 |
| 115 | (1E) | 85.6 |
| 116 | (2E) | 38.9 |
| 117 | (7E) | 75.3 |
| 118 | (16E) | 9.2 |
| 119 | (29E) | 14.2 |
| 120 | (47E) | 18.8 |
| 121 | (53E) | 75.5 |
| 122 | (65E) | 62.3 |
| 123 | (2F) | 9.3 |
| 124 | (3F) | 11.6 |
| 125 | (9F) | 16.5 |
| 126 | (12F) | 91.3 |
| 127 | (38F) | 41.5 |
| 128 | (49F) | 47.9 |
| 129 | (58F) | 76.9 |
| 130 | (66F) | 39.0 |
| 131 | (1G) | 64.2 |
| 132 | (4G) | 38.5 |
| 133 | (18G) | 27.6 |
| 134 | (19G) | 53.1 |
| 135 | (39G) | 49.3 |
| 136 | (48G) | 12.6 |
| 137 | (60G) | 21.1 |
| 138 | (61G) | 94.5 |
| 139 | (2H) | 67.3 |
| 140 | (4H) | 83.0 |
| 141 | (6H) | 59.5 |
| 142 | (7H) | 19.0 |
| 143 | (18H) | 45.5 |
| 144 | (49H) | 50.2 |
| 145 | (56H) | 70.3 |
| 146 | (63H) | 76.6 |

EXAMPLE 147

An electrophotographic photoreceptor was made in the same manner as described in Example 82 except that in the charge transporting layer on 1 μm of the charge generating layer 4 parts of 2,4,7-trinitro-9-fluorenone was used in place of p-(diphenylamino)benzaldehyde-N'-methyl-N'-phenylhydrazone and further, the thickness of the charge transporting layer was altered to 12 μm instead of 8 μm.

The thus made electrophotographic photoreceptor was charged to gain a surface potential of +600 V by means of corona discharge at +5 KV, and $E_{50}$ thereof was measured. It was 23 (lux·sec).

EXAMPLES 148 to 179

Electrophotographic photoreceptors having a double layer structure were made in the same manner as described in Example 147 except using in place of the disazo compound (2G) other disazo compounds (2A), (50A), (57A), (62A), (10B), (46B), (55B), (63B), (15C), (51C), (54C), (61C), (7D), (43D), (56D), (64D), (14R), (52E), (59E), (66E), (11F), (48F), (60F), (65F), (5G), (48G), (53G), (61G), (11H), (48H), (55H) and (62H), respectively. $E_{50}$ of each of these photoreceptors was determined. The results obtained are shown in Table 6.

TABLE 6

| Example | Disazo Compound | $E_{50}$ (lux · sec) |
|---|---|---|
| 148 | (2A) | 60.7 |
| 149 | (50A) | 57.6 |
| 150 | (57A) | 96.9 |
| 151 | (62A) | 75.7 |
| 152 | (10B) | 27.9 |
| 153 | (46B) | 59.4 |
| 154 | (55B) | 42.3 |
| 155 | (63B) | 38.9 |
| 156 | (15C) | 67.4 |
| 157 | (51C) | 18.4 |
| 158 | (54C) | 98.4 |
| 159 | (61C) | 87.0 |
| 160 | (7D) | 31.6 |
| 161 | (43D) | 22.0 |
| 162 | (56D) | 43.0 |
| 163 | (64D) | 92.9 |
| 164 | (14E) | 67.2 |
| 165 | (52E) | 60.6 |
| 166 | (59E) | 20.8 |
| 167 | (66E) | 97.6 |
| 168 | (11F) | 39.8 |
| 169 | (48F) | 31.8 |
| 170 | (60F) | 27.7 |
| 171 | (65F) | 70.3 |
| 172 | (5G) | 30.1 |
| 173 | (48G) | 39.9 |
| 174 | (53G) | 93.4 |
| 175 | (61G) | 87.1 |
| 176 | (11H) | 73.3 |
| 177 | (48H) | 22.0 |
| 178 | (55H) | 71.9 |
| 179 | (62H) | 90.0 |

EXAMPLE 180

One part of the diazo compound (2G) and one part of polycarbonate of bisphenol A were added to 25 parts of dichloromethane, and the resulting matter was ground and mixed in a ball mill to prepare a coating composition. The coating composition was coated on a conductive transparent support (a 100 μm-thick polyethylene terephthalate film on the surface of which an indium oxide evaporated film was provided, and which had surface resistance of $10^3$ Ω) in a dry thickness of about 9 μm using a wire wound rod. Thus, an electrophotographic photoreceptor having a single layer type electrophotographic photoreceptive layer was produced.

This photoreceptor was charged so as to gain surface potential of +450 V through +5 KV corona discharge and then, $E_{50}$ was measured. $E_{50}$ of this photoreceptor was 47 (lux·sec).

EXAMPLES 181 to 212

Single layer type electrophotographic photoreceptors were made in the same manner as described in Example 180 except using in place of the disazo compound (2G) other disazo compounds (3A), (51A), (56A)m (61A), (12B), (45B), (54B), (62B), (18C), (48C), (58C), (63C), (17D), (44D), (53D), (63D), (21E), (46E), (55E), (62E), (24F), (44F), (57F), (64F), (19G), (51G), (54G), (61G), (13H), (45H), (59H) and (64H), respectively. $E_{50}$ of each of these photoreceptors was determined, and results obtained are shown in Table 7.

TABLE 7

| Example | Disazo Compound | $E_{50}$ (lus · sec) |
|---|---|---|
| 181 | (3A) | 186 |
| 182 | (51A) | 95.8 |
| 183 | (56A) | 24.9 |
| 184 | (61A) | 155 |
| 185 | (12B) | 125 |
| 186 | (45B) | 66.7 |
| 187 | (54B) | 85.1 |
| 188 | (62B) | 62.1 |
| 189 | (18C) | 94.6 |
| 190 | (48C) | 85.3 |
| 191 | (58C) | 76.7 |
| 192 | (63C) | 38.6 |
| 193 | (17D) | 41.8 |
| 194 | (44D) | 90.3 |
| 195 | (53D) | 80.6 |
| 196 | (63D) | 99.6 |
| 197 | (21E) | 56.2 |
| 198 | (46E) | 175 |
| 199 | (55E) | 31.8 |
| 200 | (62E) | 82.0 |
| 201 | (24F) | 70.6 |
| 202 | (44F) | 291 |
| 203 | (57F) | 57.4 |
| 204 | (64F) | 60.3 |
| 205 | (19G) | 59.1 |
| 206 | (51G) | 98.7 |
| 207 | (54G) | 158 |
| 208 | (61G) | 140 |
| 209 | (13H) | 156 |
| 210 | (45H) | 60.9 |
| 211 | (59H) | 44.6 |
| 212 | (64H) | 181 |

EXAMPLE 188

One part of the trisazo pigment (11C), one part of p-(diphenylamino)benzaldehyde-N'-methyl-N'-phenylhydrazone employed in Example 82 and 6 parts of m-cresolformaldehyde resin were added to 30 parts of ethylene glycol monomethyl ether, and the resulting matter was ground and mixed in a ball mill to prepare a coating composition. The coating composition was coated on an about 0.25 mm-thick aluminium plate which had previously received a graining, an anodic oxidation and a pore sealding treatments in a dry thickness of about 6 μm using a wire wound rod.

Next, the thus produced sample was subjected to corona discharge so that its surface potential may become 500 V in the dark and then, exposed to tungsten light (with exposure of 300 lux·sec) through a negative image. Thereafter, it was subjected to reversal development using Mitsubishi Diafax Master LOMED toner (produced by Mitsubishi Paper Mills, Ltd.) to result in formation of very clear positive image on the printing master. The printing master obtained was dipped in the etching solution prepared by diluting an etching solution DP-1 (a sodium silicate aqueous solution prepared by Fuji Photo Film Co., Ltd.) by a factor of 10 for 1 minute to dissolve and remove part of the photosensitive layer where sticked toner was absent (that is, nonimage part). Thereupon, the pigment contained in the nonimage part was easily removed together with the binder to produce a clear image on the printing plate.

EXAMPLE 189

An electrophotographic photoreceptor was produced and its half decay exposure was measured in the same manners as described in Example 1 except that the disazo compound (1I) was employed in place of the disazo compound (1G), a dry thickness of the single layer type electrophotographic photoreceptive layer was changed from 8 μm to 9 μm, surface potential gained by +5 KV corona discharge was charged from +400 V to +450 V, and illumination density obtained at the surface using a tungsten lamp having a color temperature of 3,000° K. was changed from 4 lux to 4.5 lux. The half decay exposure obtained was 8.4 (lux·sec). Even after the two steps, charging and exposure, were repeated 3,000 times, change in the value of $E_{50}$ was hardly observed.

EXAMPLES 190 to 198

Electrophotographic photoreceptors having a single layer structure was made in the same manner as described in Example 189 except using in place of the disazo compound (1I) other disazo compounds (15I), (5I), (2I), (13I), (25I), (26I), (44I), (50I) and (58I), respectively. Half decay exposure in the case of positive charging was determined in each of these photoreceptors in the same manner as described in Example 189. Results obtained are shown in Table 8.

TABLE 8

| Example | Disazo Compound | $E_{50}$ (lus · sec) |
|---|---|---|
| 190 | (15I) | 7.8 |
| 191 | (5I) | 9.6 |
| 192 | (2I) | 7.2 |
| 193 | (13I) | 12.0 |
| 194 | (25I) | 9.6 |
| 195 | (26I) | 5.6 |
| 196 | (44I) | 9.8 |
| 197 | (50I) | 11.2 |
| 198 | (58I) | 23.5 |

EXAMPLE 199

An electrophotographic phororeceptor having an electrophotographic photoreceptive layer constructed of two layers was made in the same manner as described in Example 82 except using the disazo compound (1I) in place of the disazo compound (2G), and half decay exposure of this photoreceptor was measured. $E_{50}$ determined was 8.9 (lux·sec).

EXAMPLES 200 to 209

Electrophotographic photoreceptors having a double layer structure were made in the same manner as described in Example 199 except in place of the disazo compound (1I) other disazo compounds (4I), (5I), (9I), (11I), (18I), (43I), (47I), (50I), (53I), and (54I), respectively. $E_{50}$ values of these photoreceptors were measured, and the results are shown in Table 9.

TABLE 9

| Example | Disazo Compound | $E_{50}$ (lux · sec) |
|---------|-----------------|----------------------|
| 200 | (4I) | 6.0 |
| 201 | (5I) | 7.8 |
| 202 | (9I) | 9.5 |
| 203 | (11I) | 5.7 |
| 204 | (18I) | 10.1 |
| 205 | (43I) | 6.7 |
| 206 | (47I) | 7.2 |
| 207 | (50I) | 11.4 |
| 208 | (53I) | 18.2 |
| 209 | (54I) | 13.4 |

EXAMPLE 210

A charge transporting layer having a thickness of 12 μm was formed on the charge generating layer having a thickness of 1 μm in the same manner as described in Example 199 except that 4 parts of 2,4,7-trinitro-9-fluorenone was employed in the charge transporting layer in place of p-(diphenylamino)benzaldehyde-N'-methyl-N'-phenylhydrazone.

The thus produced electrophotographic photoreceptor was charged so as to gain surface potential of +600 V by +5 KV corona discharge, and $E_{50}$ thereof was determined. It was 9.4 (lux·sec).

EXAMPLES 211 to 214

Electrophotographic photoreceptors having a double layer structure were made in the same manner as described in Example 210 except using in place of the disazo compound (1I) other disazo compounds (37I), (47I), (52I) and (60I), respectively. $E_{50}$ values of these photoreceptors were determined, and the results thereof are shown in Table 10.

TABLE 10

| Example | Disazo Compound | $E_{50}$ (lux · sec) |
|---------|-----------------|----------------------|
| 211 | 37I | 15.4 |
| 212 | 47I | 9.9 |
| 213 | 52I | 12.0 |
| 214 | 60I | 18.2 |

EXAMPLE 215

One part of the bisazo compound (1I) and one part of polycarbonate of bisphenol A were added to 25 parts of dichloromethane, and the resulting matter was ground and mixed in a ball mill to prepare a coating composition. The thus prepared coating composition was coated on a conductive transparent support (a 100 μm-thick polyethylene terephthalate film on the surface of which an indium oxide evaporated film was provided, and which had surface resistance of $10^3\Omega$) in a dry thickness of about 9 μm using a wire wound rod. Thus, an electrophotographic photoreceptor having a single layer type electrophotographic photoreceptive layer was obtained.

After this electrophotographic photoreceptor was charged so as to have surface resistance of +450 V by means of +5 KV corona discharge, $E_{50}$ was measured, and it was 8.8 (lux·sec).

EXAMPLES 216 to 219

Electrophotographic photoreceptors having a single layer structure were made in the same manner as described in Example 215 except using in place of the bisazo compound (1I) other disazo compounds (2I), (9I), (43I) and (53I), respectively, and $E_{50}$ of each of these disazo compound was determined. Results are shown in Table 11.

TABLE 11

| Example | Disazo Compound | $E_{50}$ (lux · sec) |
|---------|-----------------|----------------------|
| 216 | 2I | 10.7 |
| 217 | 9I | 11.3 |
| 218 | 43I | 9.5 |
| 219 | 53I | 16.8 |

EXAMPLE 220

An electrophotographic photoreceptor was made in the same manner as described in Example 1 except that the disazo compound (1J) was employed in place of the disazo compound (1G), and a dry thickness of a single layer type electrophotographic photorespective layer was charged from 8 μm to 8.4 μm. Half decay exposure of the thus produced photoreceptor was determined in the same manner as in Example 1 except that the photoreceptor was charged so as to gain surface potential of +420 V by means of +5 KV instead of +400 V. The result obtained was 6.6 (lux·sec). Even after the two steps, charging and exposure, were repeated 3,000 times, change in $E_{50}$ was hardly observed.

EXAMPLES 221 to 232

Electrophotographic photoreceptors having a single layer structure were made in the same manner as described in Example 220 except using in place of the disazo compound (1J) other disazo compounds (2J), (3J), (4J), (5J), (13J), (15J), (25J), (26J), (48J), (57J), (61J) and (11J), respectively. Half decay exposure in the case of positive charging was determined in the same manner as in Example 220. Results obtained are shown in Table 12.

TABLE 12

| Example | Disazo Compound | $E_{50}$ (lux · sec) |
|---------|-----------------|----------------------|
| 221 | 2J | 12 |
| 222 | 3J | 10 |
| 223 | 4J | 7.2 |
| 224 | 5J | 23 |
| 225 | 13J | 13 |
| 226 | 15J | 6.8 |
| 227 | 25J | 11 |
| 228 | 26J | 23 |
| 229 | 48J | 20 |
| 230 | 57J | 28 |
| 231 | 61J | 36 |
| 232 | 11J | 5.5 |

EXAMPLE 233

Both 5 g of the disazo compound (1J) and a solution of a 2 g of polyvinyl butyral resin (butyralation degree: 63 mol%) dissolved in 100 ml of ethanol were placed in a ball mill, and dispersed for 20 hours. The resulting mixture was coated on a conductive transparent support (a 100 μm-thick polyethylene terephthalate film which had an Aluminum oxide evaporated layer on its surface, and surface resistance of $10^3\Omega$), and dried. Thus, a charge generating layer having a dry thickness of 1 μm was formed.

On the thus formed charge generating layer was coated a solution containing 2 parts of p-(diphenylamino)benzaldehyde-N'-methyl-N'-phenylhydrazone

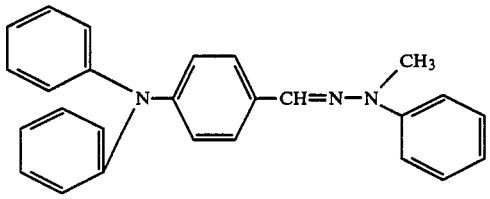

and 4 parts of polycarbonate of bisphenol A dissolved in 60 parts of dichloromethane in a dry thickness of 8 μm using a wire wound rod to form a charge transporting layer. Thus, an electrophotographic photoreceptor having an electrophotographic photoreceptive layer constructed by two layers was obtained.

After this photoreceptor was charged so as to gain a surface potential of −400 V by means of −5 KV corona discharge, half decay exposure was determined. $E_{50}$ of this photoreceptor was 5.8 (lux·sec).

EXAMPLES 234 to 243

Electrophotographic photoreceptors having a double layer structure were made and $E_{50}$ values thereof were determined in the same manners as described in Example 233 except using in place of the disazo compound (1J) other disazo compounds (6J), (7J), (8J), (12J), (16J), (43J), (47J), (50J), (53J) and (62J), respectively. Results obtained are shown in Table 13.

TABLE 13

| Example | Disazo Compound | $E_{50}$ (lux · sec) |
|---|---|---|
| 234 | 6J | 6.8 |
| 235 | 7J | 10.5 |
| 236 | 8J | 7.2 |
| 237 | 12J | 7.5 |
| 238 | 16J | 6.6 |
| 239 | 43J | 8.3 |
| 240 | 47J | 11.3 |
| 241 | 50J | 13.6 |
| 242 | 53J | 21.2 |
| 243 | 62J | 27.6 |

EXAMPLE 244

A charge transporting layer having a thickness of 12 μm was formed on the charge generating layer having a thickness of 1 μm in the same manner as described in Example 233 except that 4 parts of 2,4,7-trinitro-9-fluorenone was employed in the charge transporting layer in place of p-(diphenylamino)benzaldehyde-N'-methyl-N'-phenylhydrazone.

The thus produced electrophotographic photoreceptor was charged so as to grain surface potential of +600 V by means of +5 KV corona discharge, and $E_{50}$ thereof was determined. The result obtained was 7.2 (lux·sec).

EXAMPLES 245 to 248

Electrophotographic photoreceptors having a double layer structure were made in the same manner as described in Example 244 except using in place of the disazo compound (1J) other disazo compounds (9J), (44J) and (63J), respectively. $E_{50}$ values of these photoreceptors were determined, and the results obtained are shown in Table 14.

TABLE 14

| Example | Disazo Compound | $E_{50}$ (lux · sec) |
|---|---|---|
| 245 | 9J | 8.7 |
| 246 | 44J | 11.8 |
| 247 | 54J | 14.1 |
| 248 | 63J | 25.3 |

EXAMPLE 249

One part of the disazo compound (1J) and one part of polycarbonate of bisphenol A were added to 25 parts of dichloromethane, and the resulting matter was ground and mixed in a ball mill to prepare a coating composition. This composition was coated on a conductive transparent support (a 100 μm-thick polyethylene terephthalate film which had an indium oxide evaporated layer on its surface, and surface resistance of $10^3\Omega$) in a dry thickness of about 9 μm using a wire wound rod. Thus, an electrophotographic photoreceptor having a single layer type electrophotographic photoreceptive layer was obtained.

After this photoreceptor was charged so as to gain surface potential of +450 V by means of +5 KV corona discharge, $E_{50}$ was determined. It was 9.8 (lux·sec).

EXAMPLES 250 to 253

Electrophotographic photoreceptors having a single layer structure were made in the same manner as described in Example 249 except using in place of the disazo compound (1J) other disazo compounds (10J), (45J), (58J) and (64J), respectively, and $E_{50}$ values thereof were also determined in the same manner as described in Example 249. The results obtained are shown in Table 15.

TABLE 15

| Example | Disazo Compound | $E_{50}$ (Sux · sec) |
|---|---|---|
| 250 | (10J) | 12.5 |
| 251 | (45J) | 16.9 |
| 252 | (58J) | 10.3 |
| 253 | (64J) | 22.8 |

EXAMPLE 254

One part of the disazo pigment (1J), one part of p-(diphenylamino)benzaldehyde-N'-methyl-N'-phenylhydrazone employed in Example 233 and 6 parts of m-cresol-formaldehyde resin were added to 30 parts of ethylene glycol monomethyl ether, and the resulting matter was ground and mixed in a ball mill to prepare a coating composition. The coating composition was coated on an about 0.25 mm-thick aluminum plate which had previously received a graining, an anodic oxidation and a pore sealding treatments to form about 6 μm thickness after drying for 10 minutes at 90° C. and a day at 50° C.

Next, the thus produced sample was subjected to corona discharge so that its surface potential may become 500 V in the dark and then, exposed to tungsten light (with exposure of 300 lux·sec) through a negative image. Thereafter, it was subjected to reversal development and etching according to the procedures described in Example 188 and produces a clear image on the printing plate.

While the invention has been described in detail and with reference to specific embodiments thereof, it will be apparent to one skilled in the art that various changes and modifications can be made therein without departing from the spirit and scope thereof.

What is claimed is:

1. A photoconductive composition containing a disazo compound represented by the formula (I);

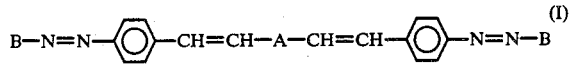

wherein A represents

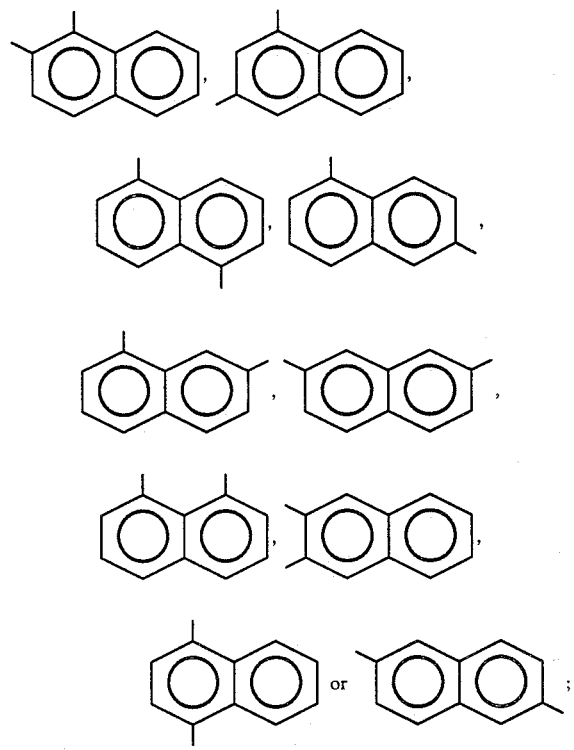

and B represents

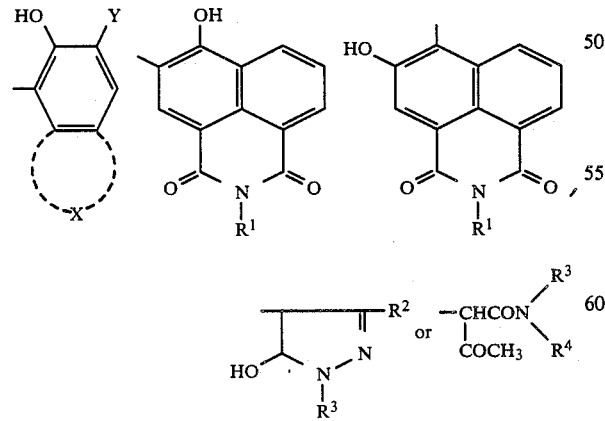

wherein X is a moiety capable of forming a substituted aromatic ring, an unsubstituted aromatic ring, an unsubstituted heterocyclic aromatic ring or a substituted heterocyclic aromatic ring by combining with the benzene ring to which a hydroxyl and Y are attached; Y represents

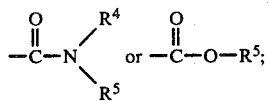

$R^1$ is selected from the group consisting of alkyl, phenyl, substituted alkyl and substituted phenyl; $R^2$ is selected from the group consisting of hydrogen, lower alkyl, carbamoyl, carboxyl, alkoxy carbonyl, aryloxy carbonyl, substituted amino and unsubstituted amino; $R^3$ and $R^5$ each is selected from the group consisting of alkyl, substituted aromatic, unsubstituted aromatic, substituted aromatic heterocyclic, unsubstituted aromatic heterocyclic, unsubstituted carbazoyl and substituted carbazoyl; and $R^4$ is selected from the group consisting of hydrogen, alkyl, phenyl, substituted alkyl and substituted phenyl.

2. A photoconductive composition as claimed in claim 1, wherein the composition further contains a binder.

3. A photoconductive composition as claimed in claim 1, wherein the disazo compound has naphthylene of

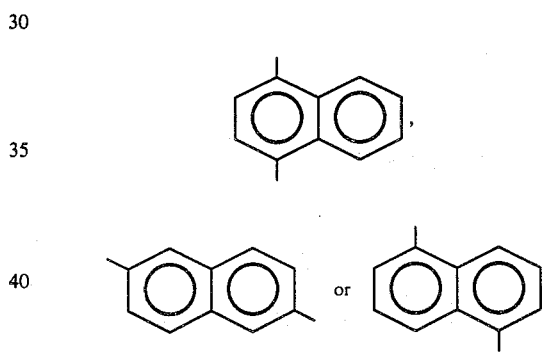

as the group A.

4. A photoconductive composition as claimed in claim 2, wherein the disazo compound has

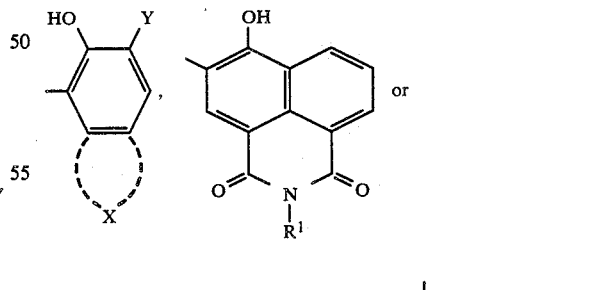

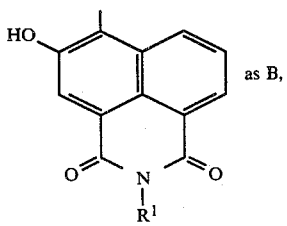

as B, $R^1$ is selected from the group consisting of alkyl, phenyl, substituted alkyl and substituted phenyl.

5. A photoconductive composition as claimed in claim 1, wherein the ring formed by X of the disazo compound is selected from the group consisting of naphthalene, anthracene, indole, carbazole, benzocarbazole and dibenzofuran; and wherein the substitutent on the moiety formed by X is selected from the group consisting of halogen and lower alkyl having 1 to 8 carbon atoms.

6. A photoconductive composition as claimed in claim 1, wherein the substituted or unsubstituted alkyl represented by $R^1$ of the disazo compound has 1 to 12 carbon atoms; wherein the substituent of the alkyl represented by $R^1$ is selected from the group consisting of hydroxyl, alkoxy having 1 to 12 carbon atoms, cyano, amino, alkylamino having 1 to 12 carbon toms, dialkylamino with alkyl moieties having to 12 carbon atoms, halogen, aryl having 6 to 15 carbon atoms and wherein the substituent for the phenyl represented by $R^1$ is selected from the group consisting of hydroxyl, alkoxy having 1 to 12 carbon atoms, cyano, amino, alkylamino having 1 to 12 carbon atoms, halogen, alkyl having 1 to 6 carbon atoms and nitro.

7. A photoconductive composition as claimed in claim 1, wherein the lower alkyl represented by $R^2$ of the disazo compound has 1 to 6 carbon atoms, the alkoxycarbonyl has an alkoxy moiety containing 1 to 12 carbon atoms, the aryloxycarbonyl has an aryloxy moiety containing 6 to 20 carbon atoms; and wherein the substituted amino represented by $R^2$ is selected from the group consisting of methylamino, ethylamino, propylamino, phenylamino, tolylamino, benzylamino, phenethylamino, dimethylamino, diethylamino and diphenylamino.

8. A photoconductive composition as claimed in claim 1, wherein the alkyl represented by $R^3$ and $R^5$ of the disazo compound contains 1 to 20 carbon atoms, and wherein the substituents of the substituted groups represented by $R^3$ and $R^5$ are selected from the group consisting of hydroxyl, cyano, nitro, halogen, alkyl containing 1 to 12 carbon atoms, alkoxy containing 1 to 12 carbon atoms, amino, alkylamino containing 1 to 12 carbon atoms, dialkylamino containing 1 to 12 carbon atoms, arylamino containing 6 to 12 carbon atoms, diarylamino with aryl moieties containing 6 to 15 carbon atoms, carboxyl, alkali metal carboxylato, alkali metal sulfonato, alkylcarbonyl, arylcarbonyl with aryl moieties having 6 to 12 carbon atoms, alkylthio having 1 to 12 carbon atoms and arylthio containing 1 to 12 carbon atoms.

9. A photoconductive composition as claimed in claim 1, wherein $R^3$ or $R^5$ of the disazo compound may have the 1 to 3 substituents in their substituted aromatics.

10. A photoconductive composition as claimed in claim 1, wherein the alkyl group represented by $R^4$ of the disazo compounds contains 1 to 20 carbon atoms.

* * * * *